US009897860B2

(12) United States Patent  
Kuboki et al.

(10) Patent No.: US 9,897,860 B2  
(45) Date of Patent: Feb. 20, 2018

(54) LIQUID CRYSTAL DISPLAY DEVICE

(71) Applicant: Sharp Kabushiki Kaisha, Osaka-shi, Osaka (JP)

(72) Inventors: Ken Kuboki, Osaka (JP); Tsuyoshi Okazaki, Osaka (JP); Yusuke Nishihara, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 8 days.

(21) Appl. No.: 15/030,672

(22) PCT Filed: Aug. 26, 2014

(86) PCT No.: PCT/JP2014/072283  
§ 371 (c)(1),  
(2) Date: Apr. 20, 2016

(87) PCT Pub. No.: WO2015/060001  
PCT Pub. Date: Apr. 30, 2015

(65) Prior Publication Data  
US 2016/0266442 A1 Sep. 15, 2016

(30) Foreign Application Priority Data  
Oct. 21, 2013 (JP) .................................. 2013-218371

(51) Int. Cl.  
*G02F 1/1337* (2006.01)  
*G02F 1/1335* (2006.01)  
(Continued)

(52) U.S. Cl.  
CPC ........ *G02F 1/133753* (2013.01); *G02F 1/137* (2013.01); *G02F 1/133528* (2013.01);  
(Continued)

(58) Field of Classification Search  
CPC ................................................ G02F 1/133753  
See application file for complete search history.

(56) References Cited

U.S. PATENT DOCUMENTS 6,724,452 B1 4/2004 Takeda et al.  
2002/0036740 A1 3/2002 Kubo et al.  
(Continued)

FOREIGN PATENT DOCUMENTS

JP 11-242225 A 9/1999  
JP 2002-202511 A 7/2002  
(Continued)

*Primary Examiner* — Edmond Lau  
(74) *Attorney, Agent, or Firm* — Keating & Bennett, LLP

(57) ABSTRACT

A first photo-alignment film (12) of a liquid crystal display device (100) includes a first and a second pre-tilt region (12a, 12b) defining pre-tilt directions (PD1, PD2) that are anti-parallel to each other, and a second photo-alignment film (22) thereof includes a third and a fourth pre-tilt region (22a, 22b) defining pre-tilt directions (PD3, PD4) that are anti-parallel to each other. The entire boundary (BD1) between the first and second pre-tilt regions and the entire boundary (BD2) between the third and fourth pre-tilt regions are aligned with each other, as seen from the display plane normal direction. A pixel electrode (11) includes a first and a second cut-off portion (11a1, 11a2) provided by cutting off at least a part of a particular edge portion (11e1, 11e2) of the outer perimeter thereof.

13 Claims, 33 Drawing Sheets

(51) Int. Cl.
*G02F 1/1343* (2006.01)
*G02F 1/137* (2006.01)

(52) U.S. Cl.
CPC .. *G02F 1/133788* (2013.01); *G02F 1/134336* (2013.01); *G02F 2001/13712* (2013.01); *G02F 2001/133531* (2013.01); *G02F 2001/133541* (2013.01); *G02F 2001/133761* (2013.01); *G02F 2201/123* (2013.01)

(56) References Cited

U.S. PATENT DOCUMENTS

| | | | |
|---|---|---|---|
| 2002/0075436 A1 | 6/2002 | Kubo et al. | |
| 2005/0276088 A1* | 12/2005 | Moon | G09G 3/3648 365/63 |
| 2009/0284703 A1 | 11/2009 | Shoraku et al. | |
| 2011/0043741 A1* | 2/2011 | Hirato | G02F 1/133707 349/143 |
| 2011/0163333 A1* | 7/2011 | Adachi | G02B 5/3016 257/88 |
| 2013/0208216 A1* | 8/2013 | Hayano | G02F 1/133528 349/96 |

FOREIGN PATENT DOCUMENTS

| | | |
|---|---|---|
| JP | 2003-043525 A | 2/2003 |
| WO | 2006/121220 A1 | 11/2006 |
| WO | 2006/132369 A1 | 12/2006 |

\* cited by examiner (a) ACTIVE MATRIX SUBSTRATE SIDE (b) COUNTER SUBSTRATE SIDE (c) AFTER ATTACHMENT (a)

(b)

(c)

(a)            (b)

(a) (b) (c)
CUT-OFF ANGLE : 0°
CUT-OFF RATIO : 0

DISCLINATION
DISCLINATION (a) (b) (c)
CUT-OFF ANGLE : 1°
CUT-OFF RATIO : 0.25

(a)       (b)       (c)

CUT-OFF ANGLE : 1°
CUT-OFF RATIO : 0.50

(a)       (b)       (c)

CUT-OFF ANGLE : 2°
CUT-OFF RATIO : 0.10

(a)  (b)  (c)

CUT-OFF ANGLE : 2°
CUT-OFF RATIO : 0.25

(a)  (b)  (c)

CUT-OFF ANGLE : 2°
CUT-OFF RATIO : 0.50

(a) (b) (c)

DISCLINATION

CUT-OFF ANGLE : 5°
CUT-OFF RATIO : 0.10

DISCLINATION (a) (b) (c)

CUT-OFF ANGLE : 5°
CUT-OFF RATIO : 0.25

(a)          (b)          (c)

CUT-OFF ANGLE : 15°
CUT-OFF RATIO : 0.05

DISCLINATION (top and bottom of (b))

(a)          (b)          (c)

CUT-OFF ANGLE : 15°
CUT-OFF RATIO : 0.10

DISCLINATION (top and bottom of (b))

(a)

(b)

DISCLINATION

DISCLINATION (c)

CUT-OFF ANGLE : 30°
CUT-OFF RATIO : 0.05

(a)

(b)

DISCLINATION

DISCLINATION (c)

CUT-OFF ANGLE : 30°
CUT-OFF RATIO : 0.10

(a)     (b)     (c)

(b) DISCLINATION / DISCLINATION (c) CUT-OFF ANGLE: 45°
CUT-OFF RATIO: 0.05

(a)     (b)     (c)

(b) DISCLINATION / DISCLINATION (c) CUT-OFF ANGLE: 45°
CUT-OFF RATIO: 0.10

(a) (b) (c) (d)

(e)

(a)   (b)   (c)   (d)

(e)
REFERENCE EXAMPLE 2 (400ppi)

(a)  (b)  (c)  (d)

(e)
REFERENCE EXAMPLE 3 (300ppi)

— FRONT DIRECTION
-- DIAGONALLY RIGHT 60° DIRECTION
⋯ DIAGONALLY UPPER 60° DIRECTION (a)  (b)  (c)  (d)

(e)
REFERENCE EXAMPLE 4 (217ppi)

(a) (b) (c) (d)

(e)
REFERENCE EXAMPLE 5 (160ppi)

(a) 　(b) 　(c) 　(d)

(e) REFERENCE EXAMPLE 6 (96ppi)

(a)　　　(b)　　　(c)　　　(d)

(e)

COMPARATIVE EXAMPLE 1 (96ppi)

(a)

(b)

(a)

(b)

(c)

ENHANCED REGION
INTERMEDIATE REGION
OFFSET REGION (a)

(b)

LIQUID CRYSTAL DISPLAY DEVICE

TECHNICAL FIELD

The present invention relates to a liquid crystal display device, and particularly to a liquid crystal display device including a liquid crystal layer of a vertical alignment type, wherein the pre-tilt direction of liquid crystal molecules is defined by a photo-alignment film.

BACKGROUND ART

In recent years, liquid crystal display devices, whose display characteristics have improved, are more and more used in television receivers, or the like. Although viewing angle characteristics of liquid crystal display devices have improved, there is a demand for further improvements. Particularly, there is a strong demand for improving viewing angle characteristics of liquid crystal display devices using a liquid crystal layer of a vertical alignment type (referred to also as liquid crystal display devices of a VA mode).

At present, liquid crystal display device of a VA mode, which are used in large-size liquid crystal display devices such as televisions, employ an alignment-divided structure in which a plurality of liquid crystal domains are formed in one pixel in order to improve the viewing angle characteristic. A mainstream method for forming an alignment-divided structure is the MVA mode. The MVA mode is disclosed in Patent Document No. 1, for example.

In the MVA mode, by providing an alignment regulating structure on the liquid crystal layer side of each of a pair of substrates that are opposing each other with a vertical alignment-type liquid crystal layer interposed therebetween, there are formed a plurality of liquid crystal domains of different orientation directions (tilt directions) (typically of four different orientation directions) within each pixel. The alignment regulating structure may be slits (openings) provided in electrodes or ribs (projecting structures), exerting alignment regulating forces from both sides of the liquid crystal layer.

Using slits and ribs, however, the alignment regulating force acting on liquid crystal molecules becomes non-uniform, thereby resulting in a distribution of response speed, because slits or ribs are linear, as opposed to cases where the pre-tilt direction is defined by an alignment film as in the conventional TN mode. Moreover, the display brightness lowers because the optical transmittance lowers in areas where slits or ribs are provided.

In order to avoid such a problem, it is preferred to form an alignment-divided structure by defining the pre-tilt direction using an alignment film, also with liquid crystal display devices of a VA mode. A liquid crystal display device of the VA mode, in which an alignment-divided structure is formed as described above, has been proposed in Patent Document No. 2 by the present applicant.

In the liquid crystal display device disclosed in Patent Document No. 2, the pre-tilt direction is defined by an alignment film, thereby forming a 4-divided alignment structure. That is, in the presence of a voltage applied across the liquid crystal layer, there are formed four liquid crystal domains within one pixel. Such a 4-divided alignment structure may also be referred to simply as a 4D structure.

In the liquid crystal display device disclosed in Patent Document No. 2, the pre-tilt direction defined by one of a pair of alignment films that are opposing each other with a liquid crystal layer interposed therebetween is generally 90° apart from that of the other alignment film. Therefore, the liquid crystal molecules assume a twisted orientation in the presence of an applied voltage. The VA mode, in which the liquid crystal molecules assume a twisted orientation due to the use of a pair of vertical alignment films provided so that their pre-tilt directions (alignment treatment directions) are orthogonal to each other as described above, may be referred to also as the VATN (Vertical Alignment Twisted Nematic) mode or the RTN (Reverse Twisted Nematic) mode. As already described above, since a 4D structure is formed by the liquid crystal display device of Patent Document No. 2, the present applicant refers to the display mode of the liquid crystal display device of Patent Document No. 2 as the 4D-RTN mode.

As a specific method for allowing the pre-tilt direction of the liquid crystal molecules to be defined by an alignment film, methods in which a photo-alignment treatment is performed as described in Patent Document No. 2 have been considered promising. Since the photo-alignment treatment can be done with no direct contact, no static electricity will occur due to friction as in a rubbing treatment, and it is possible to improve the production yield. Patent Document No. 3 also discloses a liquid crystal display device of the VAIN mode using an alignment film (photo-alignment film) having been subjected to a photo-alignment treatment.

CITATION LIST

Patent Literature

[Patent Document No. 1] Japanese Laid-Open Patent Publication No. 11-242225

[Patent Document No. 2] International Publication WO2006/132369

[Patent Document No. 3] International Publication WO2006/121220

SUMMARY OF INVENTION

Technical Problem

In recent years, however, the definition of the liquid crystal display device has increased, and a study by the present inventors has indicated that a display defect may occur (particularly, while playing a movie), if a VAIN mode using a photo-alignment film is employed for a high-definition liquid crystal display device. Specifically, it has been found that with high-definition pixel designs for medium- to small-size applications, the stability of the orientation of liquid crystal molecules or the response speed thereof may be insufficient.

The present invention, which has been made in view of the problems set forth above, has an object to provide a liquid crystal display device of the VA mode which is suitable for higher definitions and in which the pre-tilt direction of the liquid crystal molecules is defined by a photo-alignment film.

Solution to Problem

A liquid crystal display device according to an embodiment of the present invention includes a plurality of pixels arranged in a matrix pattern, the liquid crystal display device including: a first substrate and a second substrate arranged so as to oppose each other; and a liquid crystal layer of a vertical alignment type provided between the first substrate and the second substrate, wherein: the first substrate includes a pixel electrode provided in each of the plurality of pixels, and a first photo-alignment film provided between the pixel electrode and the liquid crystal layer; the second substrate includes a counter electrode opposing the pixel electrode, and a second photo-alignment film provided between the counter electrode and the liquid crystal layer; the first photo-alignment film has, in each of the plurality of pixels, a first pre-tilt region defining a first pre-tilt direction, and a second pre-tilt region defining a second pre-tilt direction, which is anti-parallel to the first pre-tilt direction; the second photo-alignment film has, in each of the plurality of pixels, a third pre-tilt region defining a third pre-tilt direction, and a fourth pre-tilt region defining a fourth pre-tilt direction, which is anti-parallel to the third pre-tilt direction; as seen from a display plane normal direction, an entire boundary between the first pre-tilt region and the second pre-tilt region of the first photo-alignment film and an entire boundary between the third pre-tilt region and the fourth pre-tilt region of the second photo-alignment film are aligned with each other; an outer perimeter of the pixel electrode includes a first edge portion and a second edge portion; a direction which is orthogonal to the first edge portion and which extends toward inside of the pixel electrode is opposite to the first pre-tilt direction; a direction which is orthogonal to the second edge portion and which extends toward inside the pixel electrode is opposite to the second pre-tilt direction; and the pixel electrode includes a first cut-off portion provided by cutting off at least a part of the first edge portion, and a second cut-off portion provided by cutting off at least a part of the second edge portion.

In one embodiment, the first cut-off portion has a right triangle shape obtained by cutting off a corner of the pixel electrode in the vicinity of the first edge portion; and the second cut-off portion has a right triangle shape obtained by cutting off a corner of the pixel electrode in the vicinity of the second edge portion.

In one embodiment, where $a_1$, $a_2$ and b denote lengths of the first cut-off portion, the second cut-off portion and the pixel electrode, respectively, along a direction orthogonal to the first pre-tilt direction and the second pre-tilt direction, the length $a_1$ of the first cut-off portion, the length $a_2$ of the second cut-off portion and the length b of the pixel electrode satisfy relationships $a_1/b \geq 0.25$ and $a_2/b \geq 0.25$.

In one embodiment, the length $a_1$ of the first cut-off portion, the length $a_2$ of the second cut-off portion and the length b of the pixel electrode satisfy relationships $a_1/b \leq 0.5$ and $a_2/b \leq 0.5$.

In one embodiment, an angle $\phi_1$ formed between a hypotenuse of the first cut-off portion and the first edge portion and an angle $\phi_2$ formed between a hypotenuse of the second cut-off portion and the second edge portion satisfy relationships $\phi_1 \geq 1°$ and $\phi_2 \geq 1°$.

In one embodiment, as seen from the display plane normal direction, the first pre-tilt region of the first photo-alignment film and the third pre-tilt region of the second photo-alignment film are aligned with each other and the second pre-tilt region of the first photo-alignment film and the fourth pre-tilt region of the second photo-alignment film are aligned with each other; and the third pre-tilt direction is anti-parallel to the first pre-tilt direction, and the fourth pre-tilt direction is anti-parallel to the second pre-tilt direction.

In one embodiment, when a voltage is applied between the pixel electrode and the counter electrode, four liquid crystal domains are formed in the liquid crystal layer in each of the plurality of pixels; and azimuth directions of four directors representing orientation directions of liquid crystal molecules included in the four liquid crystal domains, respectively, are different from each other.

In one embodiment, the liquid crystal display device having such a configuration as described above further includes a pair of linear polarizers which are arranged so as to oppose each other with the liquid crystal layer interposed therebetween and so that transmission axes thereof are generally orthogonal to each other, wherein the transmission axes of the pair of linear polarizers form an angle of generally 45° with respect to the first pre-tilt direction.

In one embodiment, the liquid crystal display device having such a configuration as described above further includes a pair of circular polarizers opposing each other with the liquid crystal layer interposed therebetween.

In one embodiment, the liquid crystal layer includes liquid crystal molecules having a negative dielectric anisotropy.

In one embodiment, a shorter one of a pixel pitch along a display plane horizontal direction and a pixel pitch along a display plane vertical direction is 42 µm or less.

In one embodiment, a screen resolution is 200 ppi or more.

Advantageous Effects of Invention

According to an embodiment of the present invention, there is provided a liquid crystal display device of a VA mode which is suitable for higher-definition applications, and in which the pre-tilt direction of liquid crystal molecules is defined by a photo-alignment film.

DESCRIPTION OF EMBODIMENTS

Embodiments of the present invention will be described with reference to the drawings. Note that the present invention is not limited to the following embodiments.

Figure 1:
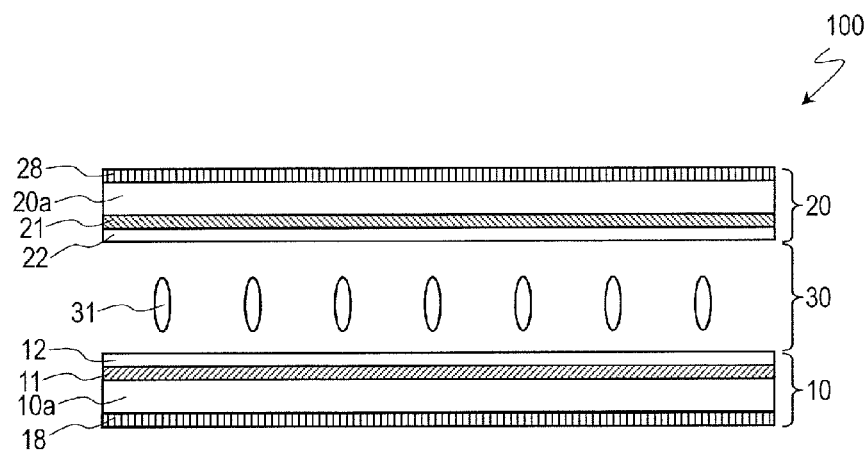
FIG. 1 A cross-sectional view schematically showing a liquid crystal display device 100 according to an embodiment of the present invention.

FIG. 1 shows a liquid crystal display device 100 of the present embodiment. FIG. 1 is a cross-sectional view schematically showing the liquid crystal display device 100.

As shown in FIG. 1, the liquid crystal display device 100 includes an active matrix substrate (first substrate) 10 and a counter substrate (second substrate) 20 arranged so as to oppose each other, and a liquid crystal layer 30 provided between the active matrix substrate 10 and the counter substrate 20. The liquid crystal display device 100 further includes a plurality of pixels arranged in a matrix pattern. Typically, the plurality of pixels include red pixels for displaying red, green pixels for displaying green, and blue pixels for displaying blue, and three pixels (a red pixel, a green pixel and a blue pixel) together form one color display pixel.

An active matrix substrate (referred to also as a "TFT substrate") 10 includes a pixel electrode 11 provided in each of the plurality of pixels, and a first photo-alignment film 12 provided between a pixel electrode 11 and the liquid crystal layer 30. The pixel electrode 11 and the first photo-alignment film 12 are supported on an insulative transparent substrate (e.g., a glass substrate) 10a. Although not shown in the figures, the active matrix substrate includes a thin film transistor (TFT) electrically connected to the pixel electrode 11, a scanning line (gate bus line) for supplying a scanning signal to a TFT, a signal line (source bus line) for supplying a display signal to a TFT, etc.

The counter substrate (referred to also as a "color filter substrate") 20 includes a counter electrode 21 opposing the pixel electrode 11, and the second photo-alignment film 22 provided between the counter electrode 21 and the liquid crystal layer 30. The counter electrode 21 and the second photo-alignment film 22 are supported on an insulative transparent substrate (e.g., a glass substrate) 20a. Although not shown in the figures, the counter substrate 20 includes a color filter layer. Typically, the color filter layer includes red color filters provided so as to correspond to red pixels, green color filters provided so as to correspond to green pixels, and blue color filters provided so as to correspond to blue pixels.

The liquid crystal layer 30 is a liquid crystal layer of a vertical alignment type, including liquid crystal molecules 31 having a negative dielectric anisotropy. In the absence of a voltage applied across the liquid crystal layer 30, the liquid crystal molecules 31 are oriented generally vertical to the substrate surface, as shown in FIG. 1.

The liquid crystal display device 100 further includes a pair of linear polarizers 18 and 28 opposing each other with at least a liquid crystal layer 30 interposed therebetween. The linear polarizers 18 and 28 are arranged so that their transmission axes are generally orthogonal to each other. That is, the linear polarizers 18 and 28 are arranged in a cross-Nicol arrangement. Note that a pair of circular polarizers may be provided instead of the pair of linear polarizers 18 and 28. That is, light to be incident on the liquid crystal layer 30 may be either linearly-polarized light or circularly-polarized light.

The first photo-alignment film 12 and the second photo-alignment film 22 are each a vertical alignment film having been subjected to a photo-alignment treatment, and define the pre-tilt direction of the liquid crystal molecules 31. The first photo-alignment film 12 has two regions, within each pixel, defining different pre-tilt directions from each other. Similarly, the second photo-alignment film 22 has two regions, within each pixel, defining different pre-tilt directions from each other.

The alignment-divided structure formed by the first photo-alignment film 12 and the second photo-alignment film 22 of the liquid crystal display device 100 of the present embodiment will be described below, following the description of the alignment-divided structure of the 4D-RTN mode as disclosed in Patent Document No. 2 and Patent Document No. 3.

Figure 2:
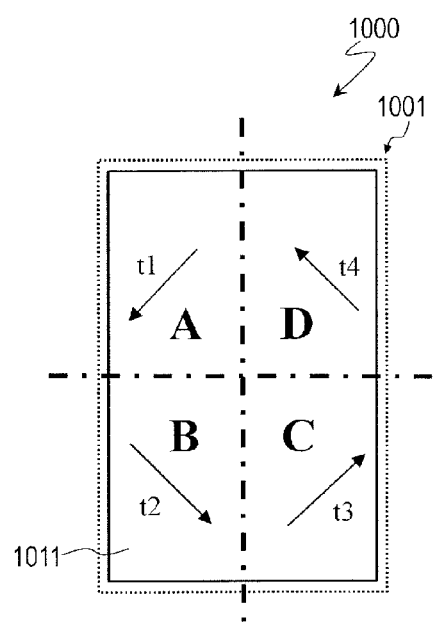
FIG. 2 A diagram showing an alignment-divided structure of a pixel 1001 in a liquid crystal display device 1000 of a common 4D-RTN mode.

FIG. 2 shows an alignment-divided structure of a pixel 1001 in a liquid crystal display device 1000 of a common 4D-RTN mode. In the presence of a voltage applied across the liquid crystal layer, four liquid crystal domains A, B, C and D are formed in the pixel 1001 as shown in FIG. 2. The four liquid crystal domains A, B, C and D are arranged in a 2-by-2 matrix pattern. Note that FIG. 2 also shows a pixel electrode 1011 provided in the pixel 1001.

The azimuth directions of the directors t1, t2, t3 and t4 of the liquid crystal domains A, B, C and D are four azimuth directions, of which the difference between any two directions is generally equal to an integer multiple of 90°. Each of the directors t1, t2, t3 and t4 is a representation of the orientation direction of the liquid crystal molecules included in the liquid crystal domain, and it in the 4D-RTN mode is the tilt direction of liquid crystal molecules in the vicinity of the center on the layer plane and in the thickness direction of the liquid crystal layer in the presence of a voltage applied across the liquid crystal layer. Each liquid crystal domain is characterized by the azimuth direction of the director (the tilt direction described above), and the azimuth direction of the director has a dominant influence on the viewing angle dependence of the domain.

Note that a pair of polarizers opposing each other with the liquid crystal layer interposed therebetween are arranged so that the transmission axes (polarization axes) are orthogonal to each other, and more specifically, they are arranged so that one transmission axis is parallel to the horizontal direction of the display plane, and the other transmission axis is parallel to the vertical direction to the display plane.

Assuming that the azimuth angle (the 3 o'clock direction) in the horizontal direction on the display plane is 0°, the azimuth direction of the director t1 of the liquid crystal domain A is a generally 225° direction, the azimuth direction of the director t2 of the liquid crystal domain B is a generally 315° direction, the azimuth direction of the director t3 of the liquid crystal domain C is a generally 45° direction, and the azimuth direction of the director t4 of the liquid crystal domain D is a generally 135° direction. That is, the liquid crystal domains A, B, C and D are arranged so that the azimuth directions of the directors are generally 90° apart from each other between adjacent liquid crystal domains.

Now, referring to FIGS. 3(a), (b) and (c), an alignment-dividing method for obtaining the alignment-divided structure of the pixel 1001 shown in FIG. 2 will be described. FIG. 3(a) shows pre-tilt directions PD1 and PD2 defined by the photo-alignment film provided on the active matrix substrate, and FIG. 3(b) shows pre-tilt directions PD3 and PD4 defined by the photo-alignment film provided on the counter substrate. FIG. 3(c) shows tilt directions (directors) in the presence of a voltage applied across the liquid crystal layer after the active matrix substrate and the counter substrate are attached together.

A region on the active matrix substrate side (a region corresponding to one pixel 1001) is divided into two regions in the left-right direction, as shown in FIG. 3(a), and the photo-alignment treatment is performed so that the photo-alignment films (vertical alignment films) of these regions (the left region and the right region) define the pre-tilt directions PD1 and PD2 that are anti-parallel to each other. Here, the photo-alignment treatment is performed through diagonal irradiations of ultraviolet light from directions indicated by the arrows.

On the other hand, a region on the counter substrate side (a region corresponding to one pixel region 1001) is divided into two regions in the up-down direction, as shown in FIG. 3(b), and the photo-alignment treatment is performed so that the photo-alignment films (vertical alignment films) of these regions (the upper region and the lower region) define the pre-tilt directions PD3 and PD4 that are anti-parallel to each other. Here, the photo-alignment treatment is performed through diagonal irradiations of ultraviolet light from directions indicated by the arrows.

Figure 3:
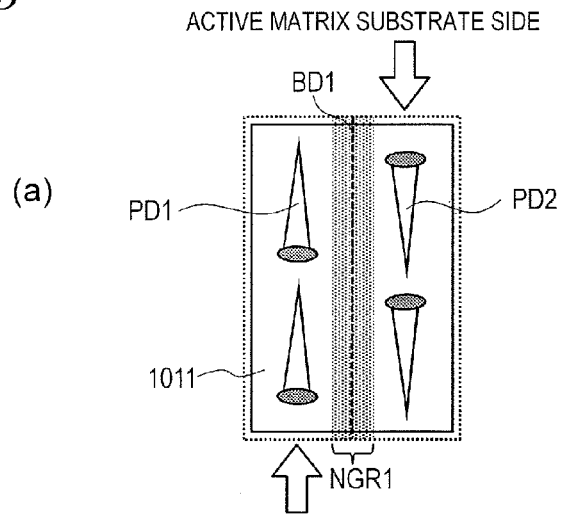
FIGS. 3(a), (b) and (c) are diagrams illustrating a method for obtaining the alignment-divided structure of the pixel 1001 shown in FIG. 2.
Figure 3:
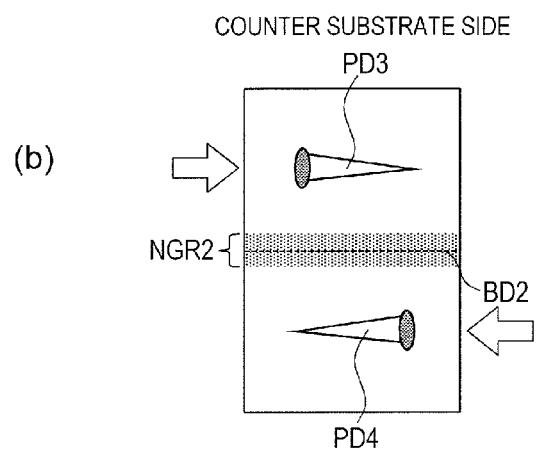
Figure 3:
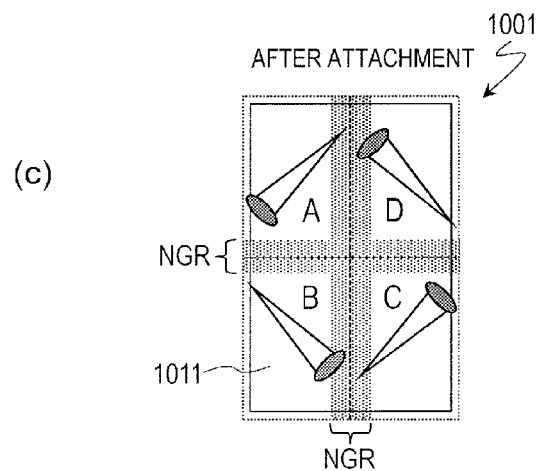

A pixel 1001 that is alignment-divided as shown in FIG. 3(*c*) can be formed by attaching together an active matrix substrate and a counter substrate which have been subjected to a photo-alignment treatment as shown in FIGS. 3(*a*) and (*b*). As can be seen from FIGS. 3(*a*), (*b*) and (*c*), for each of the liquid crystal domains A to D, the pre-tilt direction defined by the photo-alignment film of the active matrix substrate and the pre-tilt direction defined by the photo-alignment film of the counter substrate are generally 90° apart from each other, so that a tilt direction (the azimuth direction of the director of the liquid crystal domain) is defined along an intermediate direction between these two pre-tilt directions.

As already described above, a display defect may occur (particularly, while playing a movie), if such an alignment-divided structure as that of the pixel 1001 (i.e., of a common 4D-RTN mode) is employed in a high-definition liquid crystal display device. The reason for this will now be described.

When making an alignment-divided structure of the 4D-RTN mode, it is necessary to perform the exposure step twice for each of the photo-alignment film on the active matrix side and the photo-alignment film on the counter substrate side. The ultraviolet light irradiation is performed from different directions in the first exposure step and in the second exposure step. Where the exposure step is performed through a scanning exposure using a photomask, there will be a region where a sufficient pre-tilt angle cannot be realized (hereinafter referred to as an "undesirable tilt region"), due to the optical diffraction phenomenon, in the vicinity of an exposure boundary (the boundary between two regions where different pre-tilt directions are to be defined). Note that the "pre-tilt angle", as used in the present specification, refers to the angle of the long axis of the liquid crystal molecules 31 with respect to the substrate surface normal direction in the absence of an applied voltage.

Specifically, the photo-alignment film on the active matrix substrate side will have an undesirable tilt region NGR1 in the vicinity of the boundary BD1 between the left region and the right region, as shown in FIG. 3(*a*). The photo-alignment film on the counter substrate side will have an undesirable tilt region NGR2 in the vicinity of the boundary BD2 between the upper region and the lower region, as shown in FIG. 3(*b*). Therefore, with the active matrix substrate and the counter substrate attached together, each pixel 1001 has a cross-shaped undesirable tilt region NGR, including a portion extending in the vertical direction (corresponding to the undesirable tilt region NGR1) and another portion extending in the horizontal direction (corresponding to the undesirable tilt region NGR2).

With high-definition pixel designs for medium- to small-size applications, the undesirable pre-tilt region accounts for a large proportion of the entire pixel 1001 since the pixel pitch is small. Therefore, the average pre-tilt angle of the entire pixel 1001 will be small, and the orientation of the liquid crystal molecules may become unstable and the response speed may be low (i.e., the response time may be long).

Figure 4:
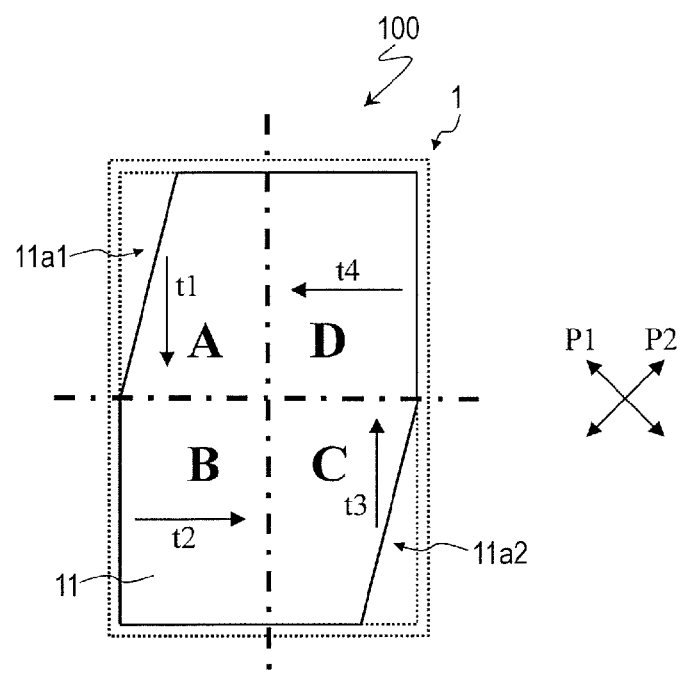
FIG. 4 A diagram showing an alignment-divided structure of a pixel 1 in the liquid crystal display device 100.

Then, the alignment-divided structure of a pixel in the liquid crystal display device 100 of the present embodiment will be described. FIG. 4 shows the alignment-divided structure of a pixel 1 in the liquid crystal display device 100.

When a voltage is applied between the pixel electrode 11 and the counter electrode 21, there are formed four liquid crystal domains A, B, C and D, in each pixel 1, in the liquid crystal layer 30, as shown in FIG. 4. The azimuth directions of the four directors t1, t2, t3 and t4 representing the orientation direction of the liquid crystal molecules 31 included in the four liquid crystal domains A, B, C and D, respectively, are different from each other.

Assuming that the azimuth angle (the 3 o'clock direction) in the horizontal direction on the display plane is 0°, the azimuth direction of the director t1 of the liquid crystal domain A is a generally 270° direction, the azimuth direction of the director t2 of the liquid crystal domain B is a generally 0° direction, the azimuth direction of the director t3 of the liquid crystal domain C is a generally 90° direction, and the azimuth direction of the director t4 of the liquid crystal domain D is a generally 180° direction. That is, the difference between any two of the azimuth directions of the four directors of the liquid crystal domains A, B, C and D is generally equal to an integer multiple of 90°.

The transmission axes (polarization axes) P1 and P2 of the pair of linear polarizers 18 and 28 each form an angle of generally 45° with respect to the azimuth directions of the directors t1, t2, t3 and t4 of the liquid crystal domains A, B, C and D. As will be understood from the description below, transmission axes P1 and P2 of the pair of linear polarizers 18 and 28 each also form an angle of generally 45° with respect to the pre-tilt direction defined by the first photo-alignment film 12 and the second photo-alignment film 22.

Note that while FIG. 4 shows an example where the four liquid crystal domains A, B, C and D each account for an equal area within the pixel 1, the areas of the four liquid crystal domains A, B, C and D may not be equal to each other. Note however that in view of the uniformity of the viewing angle characteristic, it is preferred that the area difference between the four liquid crystal domains A, B, C and D is as small as possible, and specifically, it is preferred that the difference between the area of the largest one of the four liquid crystal domains A, B, C and D and the area of the smallest liquid crystal domain is 50% or less of the largest area. FIG. 4 shows an example of the most preferred (i.e., ideal) 4-divided structure in view of the viewing angle characteristic.

As shown in FIG. 4, the pixel electrode 11 of the liquid crystal display device 100 of the present embodiment includes a plurality of cut-off portions (a first cut-off portion and a second cut-off portion) 11a1 and 11a2.

Figure 5:
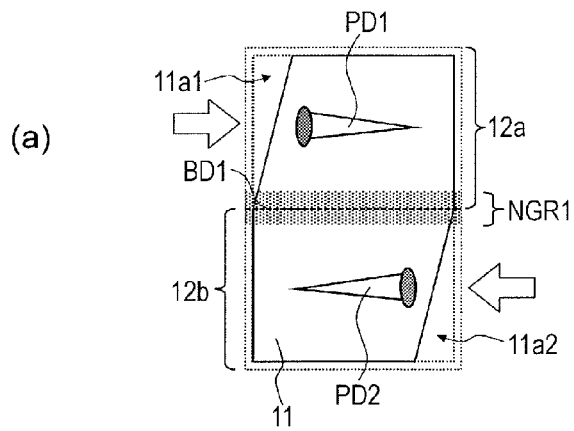
FIGS. 5(a), (b) and (c) are diagrams illustrating a method for obtaining the alignment-divided structure of the pixel 1 shown in FIG. 4.
Figure 5:
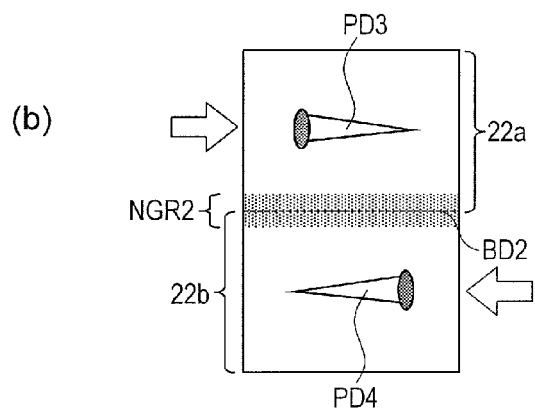
Figure 5:
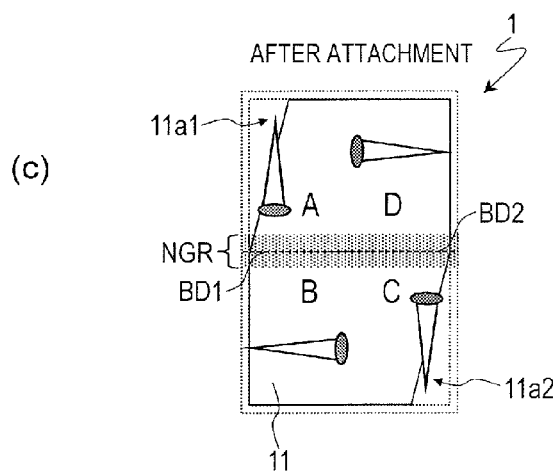

Referring now to FIGS. 5(*a*), (*b*) and (*c*), an alignment-dividing method for obtaining an alignment-divided structure of the pixel 1 in the liquid crystal display device 100 of the present embodiment will be described. FIG. 5(*a*) shows pre-tilt directions PD1 and PD2 defined by the first photo-alignment film 12 provided on the active matrix substrate 10, and FIG. 5(*b*) shows pre-tilt directions PD3 and PD4 defined by the second photo-alignment film 22 provided on the counter substrate 20. FIG. 5(*c*) shows tilt directions (directors) in the presence of a voltage applied across the liquid crystal layer 30 after the active matrix substrate 10 and the counter substrate 20 are attached together.

As shown in FIG. 5(*a*), the first photo-alignment film 12 includes, within each pixel 1, a first pre-tilt region 12a defining the first pre-tilt direction PD1, and a second pre-tilt region 12b defining the second pre-tilt direction PD2, which is anti-parallel to the first pre-tilt direction PD1. Specifically, a region of the first photo-alignment film 12 corresponding to one pixel 1 is divided into two regions in the up-down direction, and the photo-alignment treatment is performed so that these regions (the first pre-tilt region and the second pre-tilt region) 12a and 12b define anti-parallel pre-tilt directions (the first pre-tilt direction and the second pre-tilt direction) PD1 and PD2. Here, the photo-alignment treatment is performed through diagonal irradiations of ultraviolet light from directions indicated by the arrows.

On the other hand, the second photo-alignment film 22 includes, within each pixel 1, a third pre-tilt region 22a defining the third pre-tilt direction PD3 and a fourth pre-tilt region 22b defining the fourth pre-tilt direction PD4, which is anti-parallel to the third pre-tilt direction PD3, as shown in FIG. 5(b). Specifically, a region of the second photo-alignment film 22 corresponding to one pixel 1 is divided into two regions in the up-down direction, and the photo-alignment treatment is performed so that these regions (the second pre-tilt region and the third pre-tilt region) 22a and 22b define anti-parallel pre-tilt directions (the third pre-tilt direction and the fourth pre-tilt direction) PD3 and PD4. Here, the photo-alignment treatment is performed through diagonal irradiations of ultraviolet light from directions indicated by the arrows. Note that with the active matrix substrate 10 and the counter substrate 20 attached together, the third pre-tilt region 22a of the second photo-alignment film 22 is aligned with (opposes) the first pre-tilt region 12a of the first photo-alignment film 12, and the fourth pre-tilt region 22b of the second photo-alignment film 22 is aligned with (opposes) the second pre-tilt region 12b of the first photo-alignment film 12, as seen from the display plane normal direction. With the active matrix substrate 10 and the counter substrate 20 attached together, the third pre-tilt direction PD3 is anti-parallel to the first pre-tilt direction PD1, and the fourth pre-tilt direction PD4 is anti-parallel to the second pre-tilt direction PD2.

Figure 6:
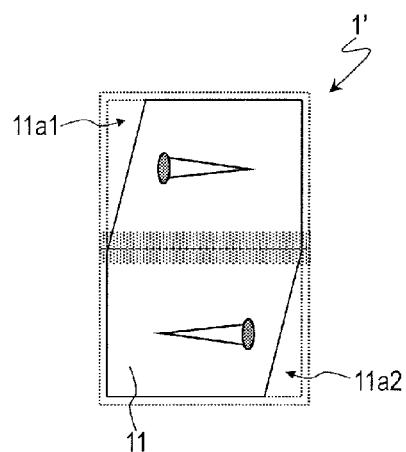
FIG. 6 A diagram schematically showing liquid crystal domains to be formed when taking into consideration only the alignment regulating forces of a first photo-alignment film 12 and a second photo-alignment film 22.

A pixel 1 that is alignment-divided as shown in FIG. 5(c) can be formed by attaching together the active matrix substrate 10 and the counter substrate 20 which have been subjected to a photo-alignment treatment as shown in FIGS. 5(a) and (b). Note that when taking into consideration only the alignment regulating force of the first photo-alignment film 12 and the second photo-alignment film 22 having been subjected to a photo-alignment treatment as shown in FIGS. 5(a) and (b), one may think that only two liquid crystal domains will be formed as in a pixel 1' shown in FIG. 6 in the presence of an applied voltage. However, for reasons to be described below, there are actually formed the four liquid crystal domains A, B, C and D, as shown in FIG. 5(c).

There may be an undesirable tilt region NGR1, where a sufficient pre-tilt angle cannot be realized, in the vicinity of the boundary BD1 between the first pre-tilt region 12a and the second pre-tilt region 12b of the first photo-alignment film 12 (see FIG. 5(a)). There may be an undesirable tilt region NGR2, where a sufficient pre-tilt angle cannot be realized, in the vicinity of the boundary BD2 between the third pre-tilt region 22a and the fourth pre-tilt region 22b of the second photo-alignment film 22. However, as shown in FIG. 5(c), in the liquid crystal display device 100 of the present embodiment, the entire boundary BD1 between the first pre-tilt region 12a and the second pre-tilt region 12b of the first photo-alignment film 12 and the entire boundary BD2 between the third pre-tilt region 22a and the fourth pre-tilt region 22b of the second photo-alignment film 22 are aligned with each other, as seen from the display plane normal direction. Thus, the undesirable tilt region NGR1 on the side of the first photo-alignment film 12 and the undesirable tilt region NGR2 on the side of the second photo-alignment film 22 are aligned with each other, thereby forming an undesirable tilt NGR extending only in the horizontal direction for the entire pixel 1, as shown in FIG. 5(c).

Therefore, with the pixel 1 of the liquid crystal display device 100 of the present embodiment, the area of the undesirable tilt region NGR can be made smaller than that with the pixel 1001 shown in FIG. 3(c). Therefore, since the lowering of the average pre-tilt angle of the entire pixel 1 (due to the undesirable tilt region NGR) can be suppressed, it is possible to sufficiently stabilize the orientation of the liquid crystal molecules 31 and to realize a sufficient response speed.

Now, a method for manufacturing the liquid crystal display device 100 of the present embodiment will be described.

First, the active matrix substrate 10 having the first photo-alignment film 12 is prepared. This step can be carried out in a similar manner to that for manufacturing an active matrix substrate of a common 4D-RTN mode. Note however that when the pixel electrode 11 is formed, a conductive film is patterned so that the first cut-off portion 11a1 and the second cut-off portion 11a2 are formed.

Next, a photo-alignment treatment is performed to form the first pre-tilt region 12a defining the first pre-tilt direction PD1 and the second pre-tilt region 12b defining the second pre-tilt direction PD2, which is anti-parallel to the first pre-tilt direction PD1, within each of regions of the first photo-alignment film 12 corresponding to a plurality of pixels 1. This step includes, for example, a step of irradiating with light a portion of the first photo-alignment film 12 to be the first pre-tilt region 12a while a portion to be the second pre-tilt region 12b is shaded with a photomask, and then irradiating with light the portion of the first photo-alignment film 12 to be the second pre-tilt region 12b while the first pre-tilt region 12a of the first photo-alignment film 12 is shaded with a photomask. Note that it is understood that a portion to be the second pre-tilt region 12b may be irradiated with light before a portion to be the first pre-tilt region 12a is irradiated with light.

On the other hand, the counter substrate 20 having the second photo-alignment film 22 is prepared, separately from the active matrix substrate 10. This step can be carried out in a similar manner to that for producing a counter substrate of a common 4D-RTN mode.

Next, a photo-alignment treatment is performed to form the third pre-tilt region 22a defining the third pre-tilt direction PD3 and the fourth pre-tilt region 22b defining the fourth pre-tilt direction PD4, which is anti-parallel to the third pre-tilt direction PD3, within each of regions of the second photo-alignment film 22 corresponding to a plurality of pixels 1. This step includes, for example, a step of irradiating with light a portion of the second photo-alignment film 22 to be the third pre-tilt region 22a while a portion to be the fourth pre-tilt region 22b is shaded with a photomask, and then irradiating with light the portion of the second photo-alignment film 22 to be the fourth pre-tilt region 22b while the third pre-tilt region 22a of the second photo-alignment film 22 is shaded with a photomask. Note that it is understood that a portion to be the fourth pre-tilt region 22b may be irradiated with light before a portion to be the third pre-tilt region 22a is irradiated with light.

Then, the active matrix substrate 10, with the first pre-tilt region 12a and the second pre-tilt region 12b formed on the first photo-alignment film 12, and the counter substrate 20, with the third pre-tilt region 22a and the fourth pre-tilt region 22b formed on the second photo-alignment film 22, are attached together.

Then, a vacuum injection method is used, for example, to inject a liquid crystal material into a gap between the active matrix substrate 10 and the counter substrate 20, thereby forming the liquid crystal layer 30. Note that it is understood that the liquid crystal layer 30 may be formed by a dripping method (i.e., applying a liquid crystal material on one of the substrates before the substrates are attached together).

The step of performing a photo-alignment treatment on the first photo-alignment film 12 and the step of performing a photo-alignment treatment on the second photo-alignment film 22 are carried out so that when the active matrix substrate 10 and the counter substrate 20 are attached together, the entire boundary BD1 between the first pre-tilt region 12a and the second pre-tilt region 12b of the first photo-alignment film 12 and the entire boundary BD2 between the third pre-tilt region 22a and the fourth pre-tilt region 22b of the second photo-alignment film 22 are aligned with each other, as seen from the display plane normal direction.

Note that a step of performing a re-alignment treatment, including a heating treatment, on the liquid crystal layer 30 may be performed after the step of attaching together the active matrix substrate 10 and the counter substrate 20. By this re-alignment treatment, it is possible to eliminate the orientation disturbance (fluid-flow orientation) occurring when injecting a liquid crystal material.

Then, the step of attaching the pair of linear polarizers 18 and 28 on the outer side of the active matrix substrate 10 and the counter substrate 20, and other steps, are performed, thereby obtaining the liquid crystal display device 100 of the present embodiment.

Note that as already described above, with the liquid crystal display device 100 of the present embodiment, even though there should be formed only two liquid crystal domains in the presence of an applied voltage, when taking into consideration only the alignment regulating force of the first photo-alignment film 12 and the second photo-alignment film 22, there are actually formed four liquid crystal domains A, B, C and D, thereby realizing a sufficiently high viewing angle characteristic. Particularly, if the screen resolution is 200 ppi or more, it is possible to obtain substantially the same viewing angle characteristic as that for the common 4D-RTN mode, as will be described later in detail.

Figure 7:
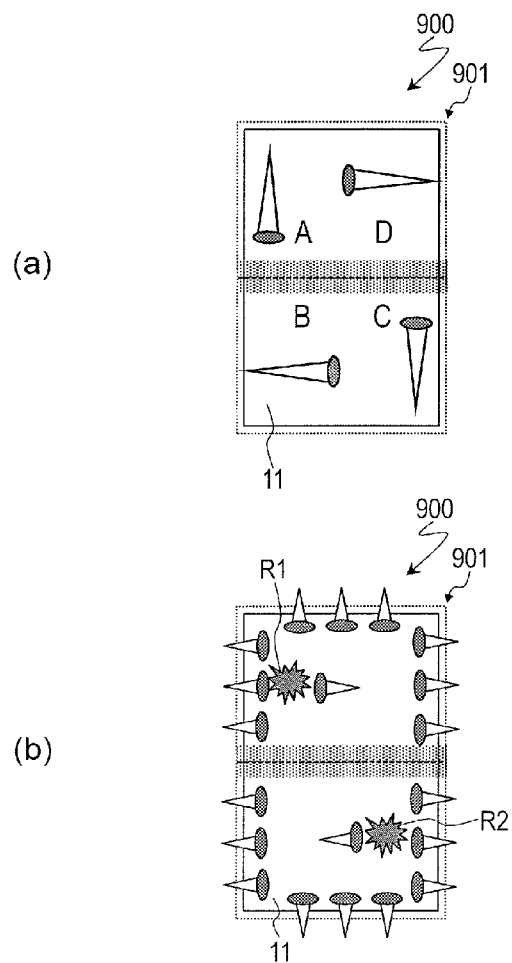
FIGS. 7(a) and (b) are diagrams schematically showing a pixel 901 of a liquid crystal display device 900 of a reference example.

With the provision of the cut-off portions (the first cut-off portion 11a1 and the second cut-off portion 11a2 shown in FIG. 4, etc.) in particular regions of the pixel electrode 11 in the liquid crystal display device 100 of the present embodiment, it is possible to further improve the display quality as compared with a case where such cut-off portions in the pixel electrode 11 provided in a pixel 901 are absent as in a liquid crystal display device 900 of a reference example shown in FIG. 7(a). The liquid crystal display device 900 of the reference example shown in FIG. 7(a) has the same configuration as the liquid crystal display device 100 of the present embodiment except that cut-off portions are absent in the pixel electrode 11. That is, also with the liquid crystal display device 900 of the reference example, a photo-alignment treatment is performed as described above with reference to FIG. 5(a) to (c). Also with the liquid crystal display device 900 of the reference example, there are formed four liquid crystal domains A, B, C and D, thereby realizing a high viewing angle characteristic.

However, an in-depth study by the prevent inventors revealed that with the liquid crystal display device 900 of the reference example, a disclination (orientation defect) occurs in particular regions (regions R1 and R2 in the figure) near the outer perimeter of the pixel electrode 11, as shown in FIG. 7(b), thereby resulting in display non-uniformity. Note that if a disclination were to occur substantially in the same region in each pixel, one might consider such disclinations not to be observed as significant non-uniformity. Even then, the presence of disclination leads to a decrease in brightness. Therefore, it is preferred to suppress the occurrence of a disclination itself.

Now, referring to FIG. 8 and FIG. 9, the results of an orientation simulation for verifying the orientation of liquid crystal molecules in the presence of an applied voltage will be described, for each of a liquid crystal display device 1000 of a common 4D-RTN mode and the liquid crystal display device 900 of the reference example. FIGS. 8(a) to (d) are views relating to the liquid crystal display device 1000 of the 4D-RTN mode, and FIGS. 9(a) to (d) are views relating to the liquid crystal display device 900 of the reference example. FIG. 8(a) and FIG. 9(a) are calculation mask diagrams, showing the pre-tilt directions PD1 and PD2 defined by the photo-alignment film on the active matrix substrate side, together with the pre-tilt directions PD3 and PD4 defined by the photo-alignment film on the counter substrate side. FIG. 8(b) and FIG. 9(b) show transmittance simulation results obtained when linear polarizers arranged so that the transmission axes P1 and P2 are generally orthogonal to each other are used as polarizers. FIG. 8(c) and FIG. 9(c) show transmittance simulation results obtained when circular polarizers are used as polarizers. FIG. 8(d) and FIG. 9(d) each show the orientation distribution within a pixel, showing, by using an arrow, the general orientation direction of liquid crystal molecules (which can be said to be the azimuth direction of the director) in each liquid crystal domain. Note that the calculation conditions for the orientation simulation are as shown in Table 1 below.

TABLE 1

| Calculation condition | | |
|---|---|---|
| Dielectric constant of liquid crystal material | Dielectric constant in molecule major axis direction $\epsilon_{//}$ | 3.7 |
| | Dielectric constant in molecule minor axis direction $\epsilon_\perp$ | 7.8 |
| Refractive index of liquid crystal material | Refractive index in molecule major axis direction $n_{//}$ | 1.6061 |
| | Refractive index in molecule minor axis direction $n_\perp$ | 1.4862 |
| Cell thickness (thickness of liquid crystal layer) | | 3.1 μm |
| Voltage applied to liquid crystal layer | | 3.75 V |
| Pixel pitch | | 28.25 μm × 84.75 μm (corresponding to screen resolution of 300 ppi) |

As can be seen from FIG. 8(a) and FIG. 9(a), the shape of the pixel electrode, etc., is the substantially same between the liquid crystal display device pixel 1000 of the 4D-RTN mode and the liquid crystal display device 900 of the reference example.

Where circular polarizers are used, although a small dark spot is present at the center of the pixel, a high brightness is realized in other areas of the pixel, for the liquid crystal display device pixel 1000 of the 4D-RTN mode and for the liquid crystal display device 900 of the reference example, as shown in FIG. 8(c) and FIG. 9(c).

Where linear polarizers are used, there appear swastika-shaped dark lines that is characteristic of the 4D-RTN mode, as shown in FIG. 8(b), with the liquid crystal display device pixel 1000 of the 4D-RTN mode. On the other hand, with the liquid crystal display device 900 of the reference example, there appear dark lines of substantially the same pattern, as shown in FIG. 9(b), though the dark lines are located slightly different from the liquid crystal display device pixel 1000 of the 4D-RTN mode. Therefore, it is believed that a 4D structure is formed also with the liquid crystal display device 900 of the reference example.

Figure 8:
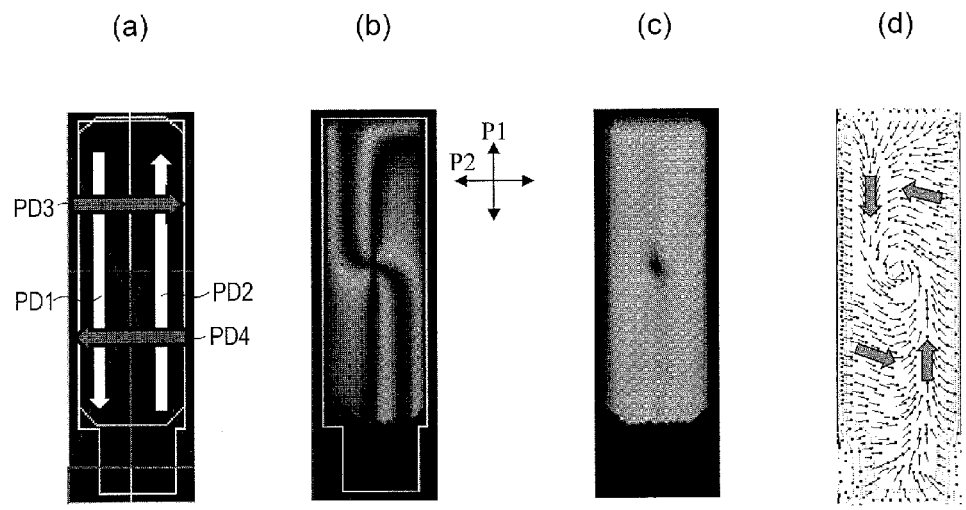
FIG. 8(a) to (d) are views illustrating the results of an orientation simulation for verifying the orientation of the liquid crystal molecules in the presence of an applied voltage, for a liquid crystal display device 1000 of a 4D-RTN mode.
Figure 9:
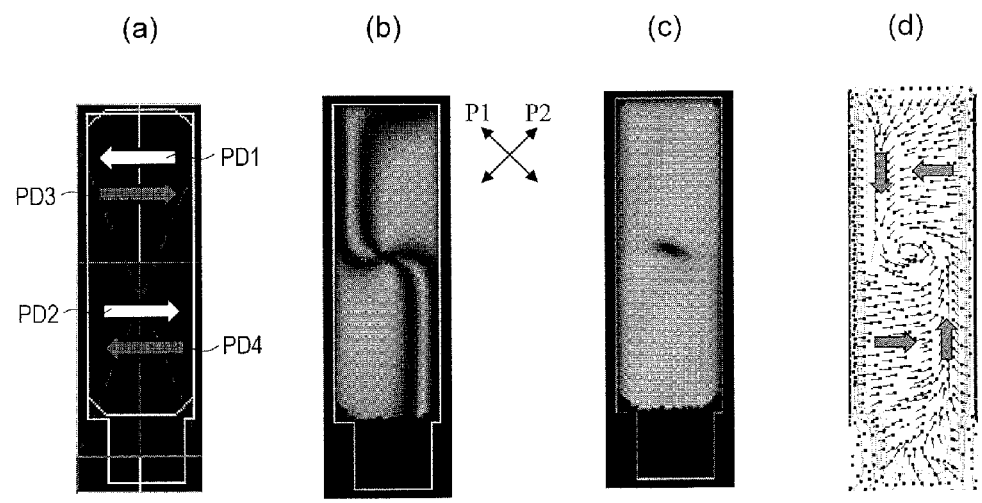
FIG. 9(a) to (d) are views illustrating the results of an orientation simulation for verifying the orientation of the liquid crystal molecules in the presence of an applied voltage for a liquid crystal display device 900 of a reference example.

As can be seen from FIG. 8(*d*) and FIG. 9(*d*), it was confirmed that liquid crystal molecules were oriented generally in four directions for the liquid crystal display device pixel 1000 of the 4D-RTN mode and for the liquid crystal display device 900 of the reference example.

Then, referring now to FIG. 10, the reason why four liquid crystal domains are formed in a pixel 901 of the liquid crystal display device 900 of the reference example will be described.

Figure 10:
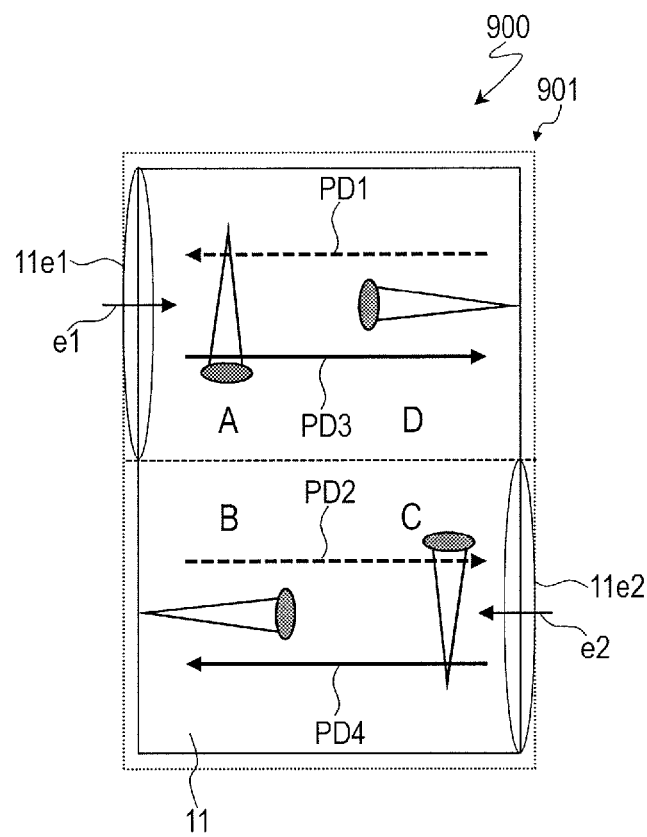
FIG. 10 A diagram illustrating the reason why four liquid crystal domains are formed in a pixel 901 of the liquid crystal display device 900 of a reference example.

As shown in FIG. 10, in the liquid crystal display device 900 of the reference example, the outer perimeter of the pixel electrode 11 includes a first edge portion 11*e*1 and a second edge portion 11*e*2. The first edge portion 11*e*1 lies near the liquid crystal domain A, and a second edge portion 11*e*2 lies near the liquid crystal domain C.

The direction e1, which is orthogonal to a first edge portion 11*e*1 and which extends toward the inside of the pixel electrode 11, is opposite to the first pre-tilt direction PD1. The direction e2, which is orthogonal to the second edge portion 11*e*2 and which extends toward the inside of the pixel electrode 11, is opposite to the second pre-tilt direction PD2.

With the outer perimeter of the pixel electrode 11 including the first edge portion 11*e*1 and the second edge portion 11*e*2, there are formed four liquid crystal domains in the presence of an applied voltage. The reason for this will now be described in greater detail with reference to FIG. 11 and FIG. 12.

Figure 11:
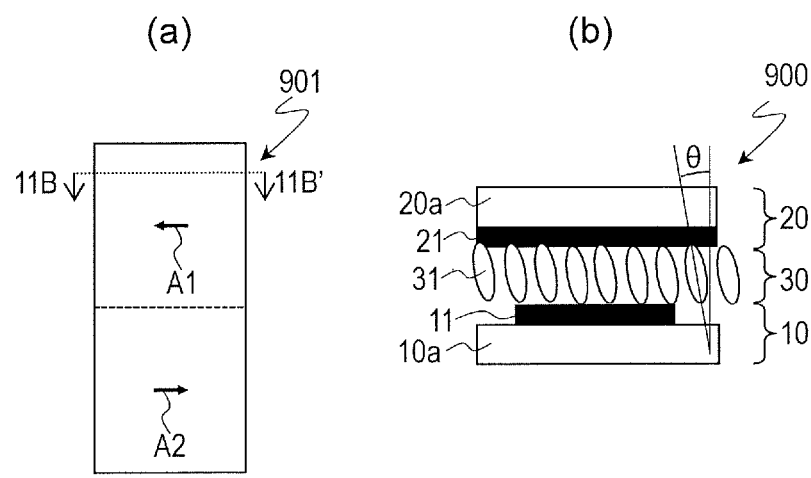
FIGS. 11(*a*) and (*b*) are diagrams illustrating the reason why four liquid crystal domains are formed in a pixel 901 of the liquid crystal display device 900 of a reference example.

FIG. 11(*a*) is a plan view showing one pixel 901, and FIG. 11(*a*) shows, by solid-line arrows A1 and A2, the alignment regulating forces from the first photo-alignment film 12 and the second photo-alignment film 22. FIG. 11(*b*) is a cross-sectional view taken along line 11B-11B' of FIG. 11(*a*), showing the orientation of the liquid crystal molecules 31 in the absence of an applied voltage. As can be seen from FIG. 11(*b*), the liquid crystal molecules 31 are pre-tilted at a predetermined angle (pre-tilt angle) θ in a predetermined direction by virtue of the alignment regulating forces A1 and A2 from the first photo-alignment film 12 and the second photo-alignment film 22 in the absence of an applied voltage. For example, in the upper half of the pixel 901, the liquid crystal molecules 31 are tilted leftward with respect to the substrate surface normal direction.

Figure 12:
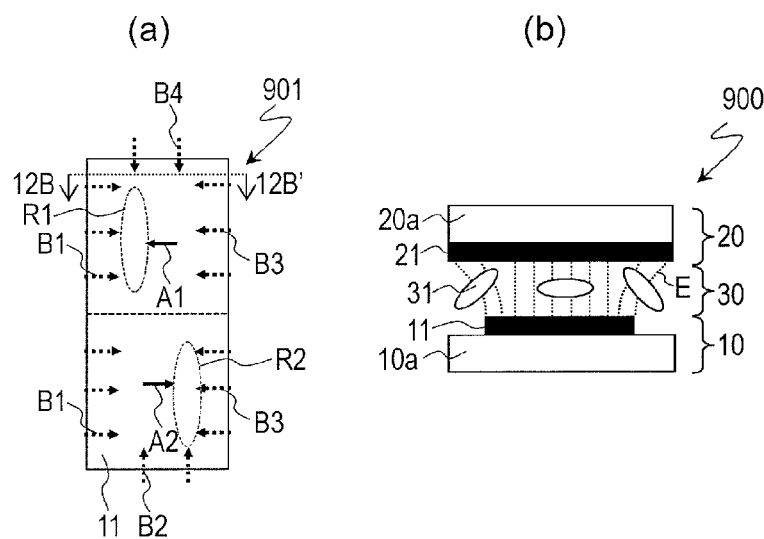
FIGS. 12(*a*) and (*b*) are diagrams illustrating the reason why four liquid crystal domains are formed in a pixel 901 of the liquid crystal display device 900 of a reference example.

FIG. 12(*a*) is a plan view showing one pixel 901, and FIG. 12(*a*) shows, by broken-line arrows B1, B2, B3 and B4, the alignment regulating forces from an oblique electric field produced in the vicinity of the outer perimeter of the pixel electrode 11, as well as the alignment regulating forces A1 and A2 from the first photo-alignment film 12 and the second photo-alignment film 22. FIG. 12(*b*) is a cross-sectional view taken along line 12B-12B' of FIG. 12(*a*), showing the orientation of the liquid crystal molecules 31 in the presence of an applied voltage (without taking into consideration the alignment regulating forces A1 and A2 from the first photo-alignment film 12 and the second photo-alignment film 22). As can be seen from FIG. 12(*b*), the liquid crystal molecules 31, which have a negative dielectric anisotropy, are oriented so as to be perpendicular to the electric force lines E in the presence of an applied voltage. Therefore, in the vicinity of the outer perimeter of the pixel electrode 11, there are alignment regulating forces urging the liquid crystal molecules 31 to tilt toward the inside of the pixel electrode 11 (the alignment regulating forces B1, B2, B3 and B4 shown in FIG. 12(*a*)).

Therefore, in portions of the pixel 901 (herein, an upper left portion and a lower right portion of the pixel 901, i.e., regions R1 and R2 shown in FIG. 12(*a*)), the directions of the alignment regulating forces from the first photo-alignment film 12 and the second photo-alignment film (directions that coincide with the first pre-tilt direction PD1 and the second pre-tilt direction PD2) are opposite to the directions of the alignment regulating forces from an oblique electric field (directions which are orthogonal to the edge portion of the pixel electrode 11 and which extend toward the inside of the pixel electrode 11).

Figure 13:
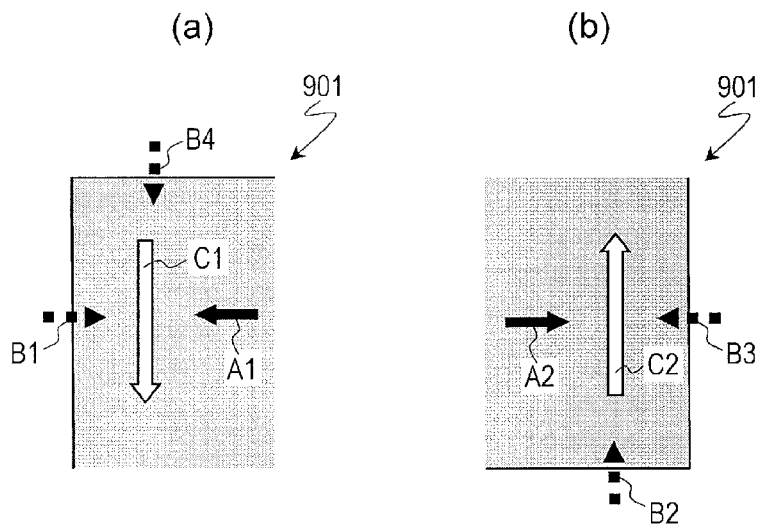
FIGS. 13(*a*) and (*b*) are diagrams illustrating the reason why four liquid crystal domains are formed in a pixel 901 of the liquid crystal display device 900 of a reference example.

FIG. 13(*a*) shows, on an enlarged scale, an upper left portion of the pixel 901. In this portion, the alignment regulating force A1 from the first photo-alignment film 12 and the second photo-alignment film 22 and the alignment regulating forces B1 and B4 from an oblique electric field interact with each other, thereby tilting the liquid crystal molecules 31 downward (the direction C1).

FIG. 13(*b*) shows, on an enlarged scale, a lower right portion of the pixel 901. In this portion, the alignment regulating force A2 from the first photo-alignment film 12 and the second photo-alignment film 22 and the alignment regulating forces B2 and B3 from an oblique electric field interact with each other, thereby tilting the liquid crystal molecules 31 upward (the direction C2).

With the mechanism described above, in the liquid crystal domains A and C in the vicinity of the first edge portion 11*e*1 and the second edge portion 11*e*2, the liquid crystal molecules 31 are oriented in the display plane vertical directions (the generally 270° direction and the generally 90° direction) in the presence of an applied voltage. Therefore, four liquid crystal domains A, B, C and D are formed within the pixel 1, of which the azimuth directions of the directors are different from each other.

Thus, with the liquid crystal display device 900 of the reference example, there are actually formed four liquid crystal domains A, B, C and D within each pixel 901 in the presence of an applied voltage, thereby realizing a sufficiently high viewing angle characteristic. However, with the liquid crystal display device 900 of the reference example, a disclination may occur in particular regions (the regions R1 and R2 in FIG. 12(*a*)) near the outer perimeter of the pixel electrode 11. A disclination is thought to occur for the following reason.

Figure 14:
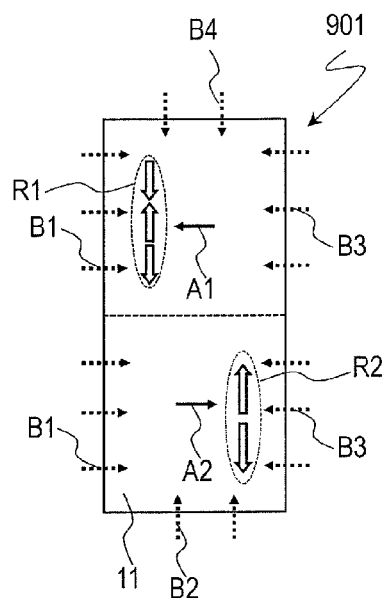
FIG. 14 A diagram illustrating the reason why a disclination occurs in a pixel 901 of the liquid crystal display device 900 of a reference example.

In an upper left portion of the pixel 901 (near the first edge portion 11*e*1), the alignment regulating force A1 from the first photo-alignment film 12 and the second photo-alignment film 22 and two different (rightward and downward) alignment regulating forces B1 and B4 from an oblique electric field act upon the liquid crystal molecules 31, as already described above. It is believed that since the alignment regulating force A1 from the first photo-alignment film 12 and the second photo-alignment film 22 and one (the rightward alignment regulating force) B1 of the two different alignment regulating forces B1 and B4 from the oblique electric field are in opposite directions from each other, the remaining alignment regulating force (the downward alignment regulating force from the oblique electric field) B4 becomes dominant, thereby tilting the liquid crystal molecules 31 downward. However, it is believed that where the dominant alignment regulating force B4 is small (not sufficiently large), it is difficult to uniformly tilt downward the liquid crystal molecules 31 across the entire region R1. Therefore, as shown in FIG. 14, the liquid crystal molecules 31 may be oriented randomly downward or upward in the region R1 near the first edge portion 11*e*1, thereby causing a disclination.

In a lower right portion of the pixel 901 (near the second edge portion 11e2), the alignment regulating force A2 from the first photo-alignment film 12 and the second photo-alignment film 22 and the two different (upward and leftward) alignment regulating forces B2 and B3 from the oblique electric field act upon the liquid crystal molecules 31, as already described above. It is believed that since the alignment regulating force A2 from the first photo-alignment film 12 and the second photo-alignment film 22 and one (the leftward alignment regulating force) B3 of the two different alignment regulating forces B2 and B3 from the oblique electric field are in opposite directions from each other, the remaining alignment regulating force (the upward alignment regulating force from the oblique electric field) B2 becomes dominant, thereby tilting the liquid crystal molecules 31 upward. However, it is believed that where the dominant alignment regulating force B2 is small (not sufficiently large), it is difficult to uniformly tilt upward the liquid crystal molecules 31 across the entire region R2. Therefore, as shown in FIG. 14, the liquid crystal molecules 31 may be oriented randomly upward or downward in the region R2 near the second edge portion 11e2, thereby causing a disclination.

As described above, with the liquid crystal display device 900 of the reference example, a disclination may occur in regions R1 and R2 near the first edge portion 11e1 and the second edge portion 11e2 of the pixel electrode 11. In contrast, with the provision of the cut-off portions (the first cut-off portion 11a1 and the second cut-off portion 11a2 shown in FIG. 4, etc.) in particular regions of the pixel electrode 11 in the liquid crystal display device 100 of the present embodiment, the occurrence of a disclination as described above is suppressed. The reason for this will now be described.

Figure 15:
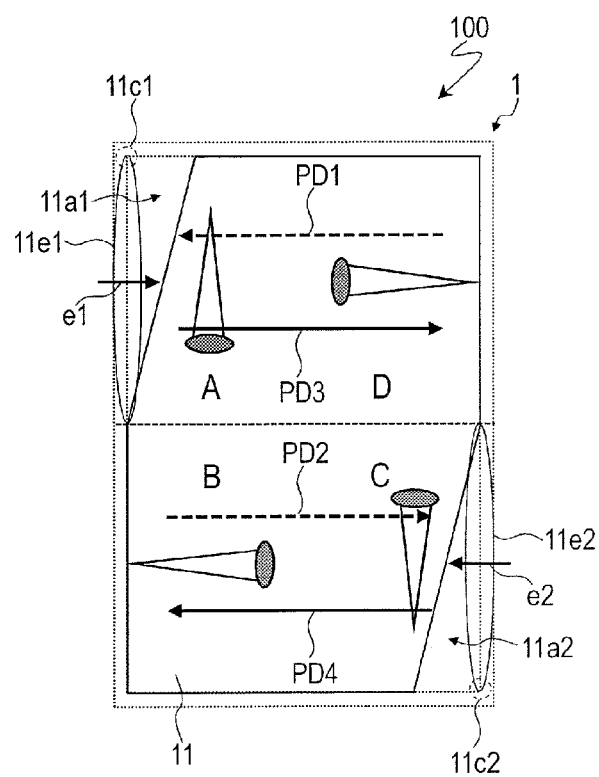
FIG. 15 A plan view schematically showing a pixel 1 of the liquid crystal display device 100.

As shown in FIG. 15, in the liquid crystal display device 100 of the present embodiment, the outer perimeter of the pixel electrode 11 includes the first edge portion 11e1 and the second edge portion 11e2. The first edge portion 11e1 lies near the liquid crystal domain A, and a second edge portion 11e2 lies near the liquid crystal domain C.

The direction e1, which is orthogonal to the first edge portion 11e1 and which extends toward the inside of the pixel electrode 11, is opposite to the first pre-tilt direction PD1. The direction e2, which is orthogonal to the second edge portion 11e2 and which extends toward the inside of the pixel electrode 11, is opposite to the second pre-tilt direction PD2.

With the outer perimeter of the pixel electrode 11 including the first edge portion 11e1 and the second edge portion 11e2 as described above, there are formed four liquid crystal domains A, B, C and D in the presence of an applied voltage also in the liquid crystal display device 100 of the present embodiment, thereby obtaining a sufficiently high viewing angle characteristic, in accordance with a similar mechanism to that described above for the liquid crystal display device 900 of the reference example.

The pixel electrode 11 of the liquid crystal display device 100 of the present embodiment includes the first cut-off portion 11a1 provided by cutting off at least a part of the first edge portion 11e1, and the second cut-off portion 11a2 provided by cutting off at least a part of the second edge portion 11e2. The first cut-off portion 11a1 has a right triangle shape obtained by cutting off a corner 11c1 of the pixel electrode 11 in the vicinity of the first edge portion 11e1. The second cut-off portion 11a2 has a right triangle shape obtained by cutting off a corner of the pixel electrode 11 in the vicinity of the second edge portion 11e2.

Note that as is clear from FIG. 15, the "outer perimeter" of the pixel electrode 11, as used in the present specification, is defined by portions of the pixel electrode where the conductive layer is present (hereinafter referred to also as "conductive layer portions") and by the cut-off portions (portions where the conductive layer is absent) 11a1 and 11a2 (i.e., it is not the outer perimeter of only the portion where the conductive layer is present). In the configuration illustrated in FIG. 15, the outer perimeter of the pixel electrode 11 is generally rectangular.

Figure 16:
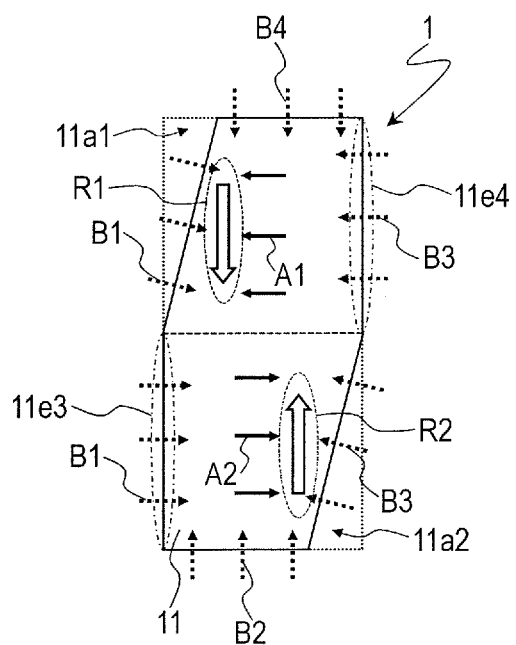
FIG. 16 A diagram illustrating the reason why the occurrence of a disclination is suppressed in a pixel 1 of the liquid crystal display device 100.

Now, referring to FIG. 16, the reason why the occurrence of a disclination is suppressed by the provision of the first cut-off portion 11a1 and the second cut-off portion 11a2 as described above will be described.

With the provision of the first cut-off portion 11a1, the edge of the conductive layer portion of the pixel electrode 11 is tilted, near the first edge portion 11e1, with respect to the display plane up-down direction (vertical direction). Therefore, as shown in FIG. 16, the alignment regulating force B1 from the oblique electric field near the first edge portion 11e1 is in a direction tilted with respect to the display plane up-down direction (vertical direction).

Figure 17:
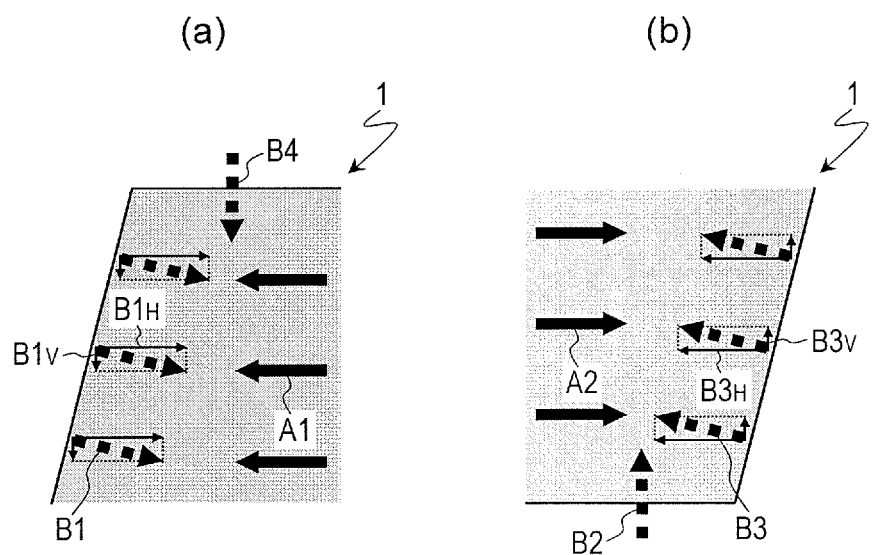
FIGS. 17(*a*) and (*b*) are diagrams illustrating the reason why the occurrence of a disclination is suppressed in a pixel 1 of the liquid crystal display device 100.

The alignment regulating force B1 can be decomposed into the horizontal direction component $B1_H$ and the vertical direction component $B1_V$, as shown in FIG. 17(a). The horizontal direction component $B1_H$ of the alignment regulating force B1 and the alignment regulating force A1 from the first photo-alignment film 12 and the second photo-alignment film 22 are in opposite directions from each other, and thus act to offset each other. In contrast, the vertical direction component $B1_V$ of the alignment regulating force B1 is in the same direction as the alignment regulating force B4, which is the dominant alignment regulating force in the region R1, and thus serves to reinforce the alignment regulating force tilting the liquid crystal molecules 31 downward. Therefore, it is possible to uniformly tilt downward the liquid crystal molecules 31 across the entire region R1 near the first edge portion 11e1, thereby suppressing the occurrence of a disclination.

With the provision of the second cut-off portion 11a2, the edge of the conductive layer portion of the pixel electrode 11 near the second edge portion 11e2 is tilted with respect to the display plane up-down direction (vertical direction). Therefore, as shown in FIG. 16, the alignment regulating force B3 from the oblique electric field near the second edge portion 11e2 is in a direction tilted with respect to the display plane up-down direction (vertical direction).

The alignment regulating force B3 can be decomposed into the horizontal direction component $B3_H$ and the vertical direction component $B3_V$, as shown in FIG. 17(b). The horizontal direction component $B3_H$ of the alignment regulating force B3 and the alignment regulating force A2 from the first photo-alignment film 12 and the second photo-alignment film 22 are in opposite directions from each other, and thus act to offset each other. In contrast, the vertical direction component $B3_V$ of the alignment regulating force B3 is in the same direction as the alignment regulating force B2, which is the dominant alignment regulating force in the region R2, and thus serves to reinforce the alignment regulating force tilting the liquid crystal molecules 31 upward. Therefore, it is possible to uniformly tilt upward the liquid crystal molecules 31 across the entire region R2 near the second edge portion 11e2, thereby suppressing the occurrence of a disclination.

Figure 18:
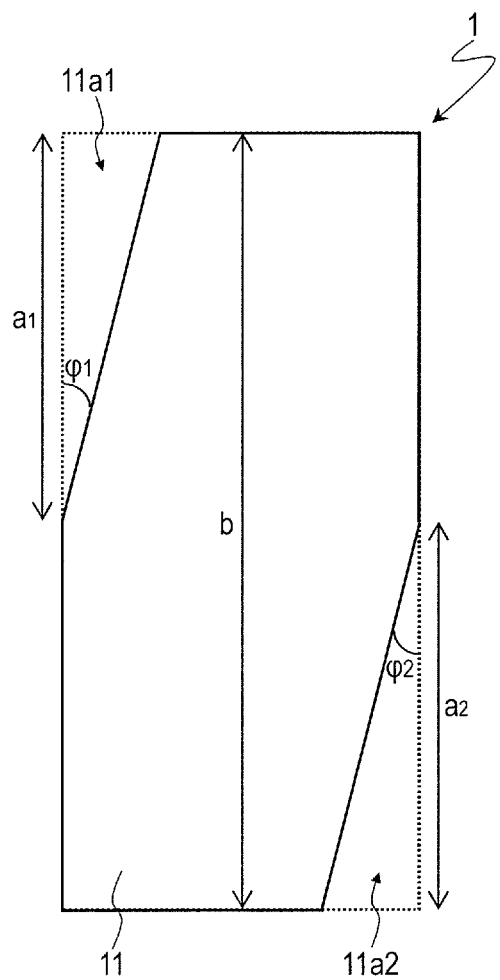
FIG. 18 A plan view schematically showing a pixel 1 of the liquid crystal display device 100.

Next, a preferred configuration of the pixel electrode 11 having the first cut-off portion 11a1 and the second cut-off portion 11a2 will be described.

Where $a_1$, $a_2$ and b denote the lengths of the first cut-off portion 11a1, the second cut-off portion 11a2 and the pixel electrode 11, respectively, along the direction orthogonal to the first pre-tilt direction PD1 and the second pre-tilt direction PD2 (the direction parallel to the first edge portion 11e1 and the second edge portion 11e2), as shown in FIG. 18, the length $a_1$ of the first cut-off portion 11a1, the length $a_2$ of the second cut-off portion 11a2 and the length b of the pixel electrode 11 preferably satisfy relationships of Expressions (1) and (2) below. That is, it is preferred that the length $a_1$ of the first cut-off portion 11a1 and the length $a_2$ of the second cut-off portion 11a2 are each 25% or more (¼ or more) of the length b of the pixel electrode 11.

$$a_1/b \geq 0.25 \quad (1)$$

$$a_2/b \geq 0.25 \quad (2)$$

Satisfying Expressions (1) and (2), it is possible to more reliably suppress the occurrence of a disclination. Results verifying this will later be discussed in detail. Note that the left-hand side of Expressions (1) and (2) ("$a_1/b$", "$a_2/b$") may be referred to hereinbelow as the "cut-off ratio".

As can be seen from the description above, the first cut-off portion 11a1 and the second cut-off portion 11a2 can be formed by cutting off edge portions (the first edge portion 11e1 and the second edge portion 11e2) near regions where the alignment regulating force from the first photo-alignment film 12 and the second photo-alignment film and the alignment regulating force from the oblique electric field are in opposite directions from each other, and it is not necessary to cut off edge portions (edge portions 11e3 and 11e4 in FIG. 16) near regions where the alignment regulating force from the first photo-alignment film 12 and the second photo-alignment film 22 and the alignment regulating force from the oblique electric field are in the same direction. Cutting off these edge portions 11e3 and 11e4 will not pose a problem in view of the orientation of the liquid crystal molecules 31 (no disclination will newly occur). Nevertheless, an increase in the proportion of the area cut off along the outer perimeter of the pixel electrode 11 may possibly increase the area where the electric field is not directly applied to the liquid crystal layer 30, thereby lowering the display brightness. Therefore, in order to realize bright display, it is preferred that the length $a_1$ of the first cut-off portion 11a1, the length $a_2$ of the second cut-off portion 11a2 and the length b of the pixel electrode 11 satisfy relationships of Expressions (3) and (4) below. That is, it is preferred that the cut-off ratios ($a_1/b$ and $a_2/b$) of the first cut-off portion 11a1 and the second cut-off portion 11a2 are each 0.5 or less. In other words, it is preferred that the length $a_1$ of the first cut-off portion 11a1 and the length $a_2$ of the second cut-off portion 11a2 are each 50% or less (½ or less) of the length b of the pixel electrode 11.

$$a_1/b \leq 0.5 \quad (3)$$

$$a_2/b \leq 0.5 \quad (4)$$

Where $\phi_1$ denotes the angle formed between the hypotenuse of the first cut-off portion 11a1 and the first edge portion 11e1 and $\phi_2$ denotes the angle formed between the hypotenuse of the second cut-off portion 11a2 and the second edge portion 11e2, as shown in FIG. 18, it is preferred that these angles (hereinafter referred to also as "cut-off angles") $\phi_1$ and $\phi_2$ satisfy relationships of Expressions (5) and (6) below.

$$\phi_1 \geq 1° \quad (5)$$

$$\phi_2 \geq 1° \quad (6)$$

Note that even if the cut-off angles $\phi_1$ and $\phi_2$ are less than 1° ($\phi_1 < 1°$, $\phi_2 < 1°$), it is believed that in theory there is realized an effect of suppressing the occurrence of a disclination. Note however that it may be difficult to actually form the first cut-off portion 11a1 and the second cut-off portion 11a2 such that the cut-off angles $\phi_1$ and $\phi_2$ are less than 1° by patterning a conductive film (the cut-off angles $\phi_1$ and $\phi_2$ may become substantially 0°).

Now, results obtained by verifying the presence/absence of a disclination (orientation defect) through an orientation simulation while varying the cut-off ratios and the cut-off angles of the first cut-off portion 11a1 and the second cut-off portion 11a2 will be discussed. Table 2 below and FIG. 19 to FIG. 32 show the simulation results. In Table 2, the symbol "x" indicates that a significant disclination occurred, the symbol "Δ" indicates that a disclination occurred albeit insignificantly, and the symbol "○" indicates that no disclination occurred. In Table 2, the symbol "●" indicates that it was clearly unlikely that a disclination would occur even though calculations were not done (with the amount of cut-off of the edge portion being even larger than those samples labeled "○"). In FIG. 19 to FIG. 32, (a) is a calculation mask diagram. In FIG. 19 to FIG. 32, (b) is a view illustrating transmittance simulation results when using linear polarizers arranged so that transmission axes thereof are generally orthogonal to each other. In FIG. 19 to FIG. 32, (c) is a view showing the orientation distribution within a pixel. Note that the calculation conditions for the orientation simulation are as shown in Table 3 below.

TABLE 2

| | | Cut-off ratio ($a_1/b$, $a_2/b$) | | | | |
|---|---|---|---|---|---|---|
| | | 0 | 0.05 | 0.10 | 0.25 | 0.50 |
| Cut-off angle ($\phi_1$, $\phi_2$) | 0° | Δ | — | — | — | — |
| | 1° | Δ | — | Δ | ○ | ○ |
| | 2° | Δ | — | Δ | ○ | ○ |
| | 5° | — | — | Δ | ○ | ● |
| | 15° | — | Δ | Δ | ● | ● |
| | 30° | — | Δ | Δ | ● | ● |
| | 45° | — | Δ | Δ | ● | ● |

TABLE 3

| Calculation condition | | |
|---|---|---|
| Dielectric constant of liquid crystal material | Dielectric constant in molecule major axis direction $\epsilon_{//}$ | 3.7 |
| | Dielectric constant in molecule minor axis direction $\epsilon_\perp$ | 7.8 |
| Refractive index of liquid crystal material | Refractive index in molecule major axis direction $n_{//}$ | 1.6061 |
| | Refractive index in molecule minor axis direction $n_\perp$ | 1.4862 |
| Cell thickness (thickness of liquid crystal layer) | | 3.1 μm |
| Voltage applied to liquid crystal layer | 0 V → 3.75 V Varied slowly to voltage value where brightness corresponding to white display is obtained | |
| Pixel pitch | 88.5 μm × 265.5 μm | |
| Pre-tile angle | 2.0° | |
| Interval between adjacent pixel electrodes | 6 μm | |

Figure 19:
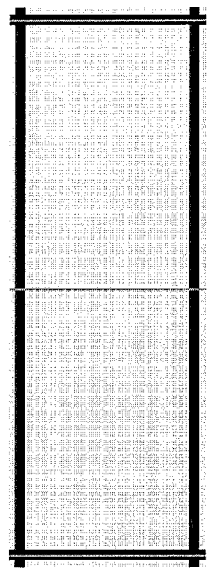
FIG. 19 Views illustrating the results of an orientation simulation when the cut-off angle is 0° and the cut-off ratio is 0.
Figure 19:
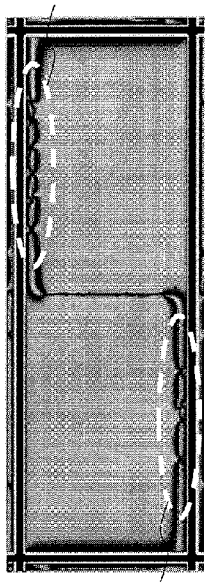
Figure 19:
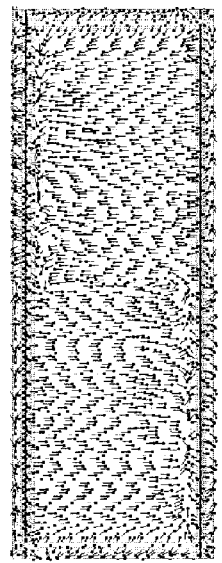
Figure 20:
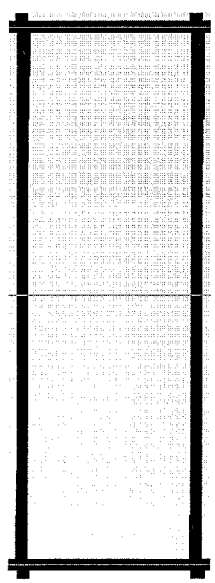
FIG. 20 Views illustrating the results of an orientation simulation when the cut-off angle is 1° and the cut-off ratio is 0.25.
Figure 20:
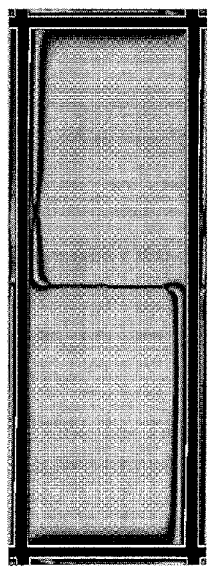
Figure 20:
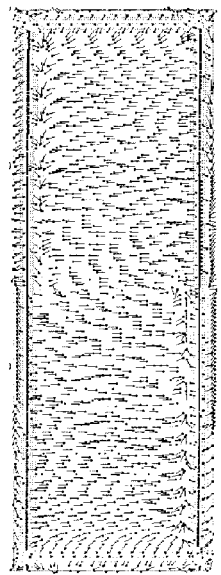
Figure 21:
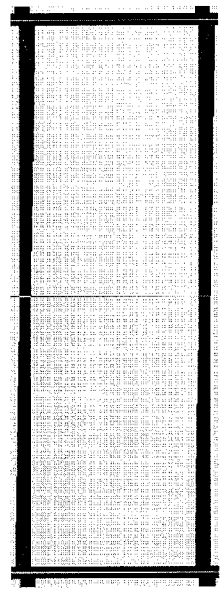
FIG. 21 Views illustrating the results of an orientation simulation when the cut-off angle is 1° and the cut-off ratio is 0.50.
Figure 21:
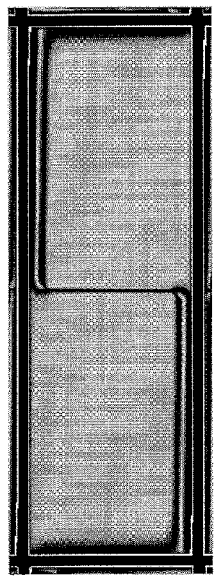
Figure 21:
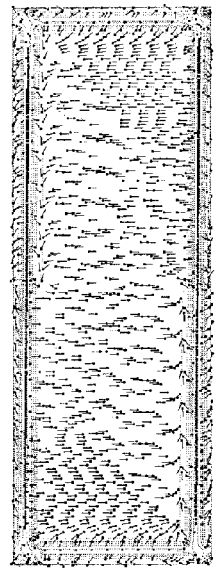
Figure 22:
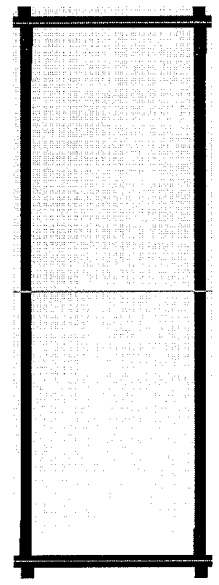
FIG. 22 Views illustrating the results of an orientation simulation when the cut-off angle is 2° and the cut-off ratio is 0.10.
Figure 22:
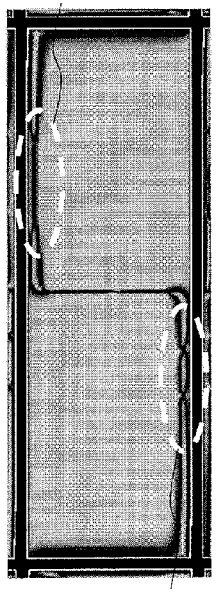
Figure 22:
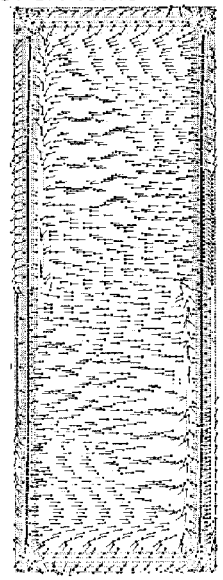
Figure 23:
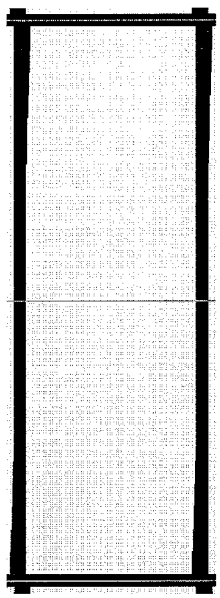
FIG. 23 Views illustrating the results of an orientation simulation when the cut-off angle is 2° and the cut-off ratio is 0.25.
Figure 23:
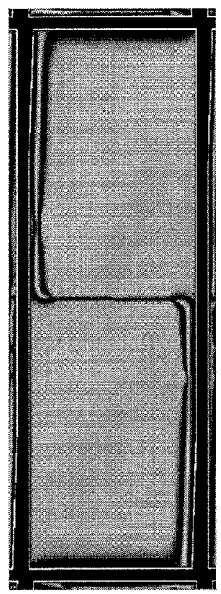
Figure 23:
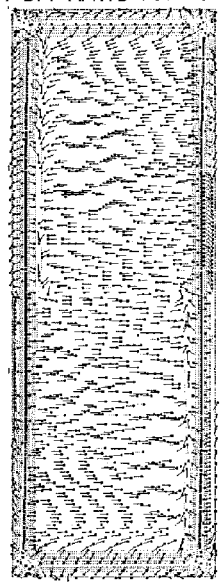
Figure 24:
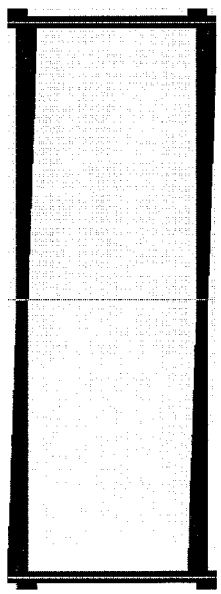
FIG. 24 Views illustrating the results of an orientation simulation when the cut-off angle is 2° and the cut-off ratio is 0.50.
Figure 24:
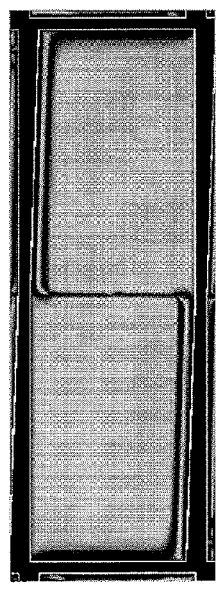
Figure 24:
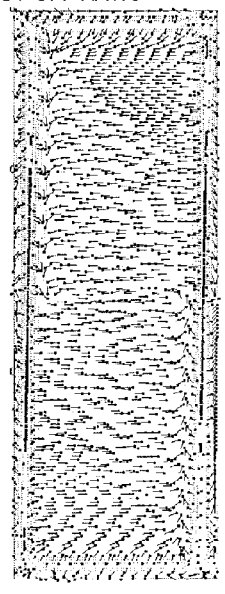
Figure 25:
FIG. 25 Views illustrating the results of an orientation simulation when the cut-off angle is 5° and the cut-off ratio is 0.10.
Figure 25:
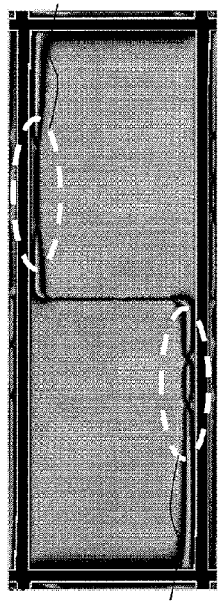
Figure 25:
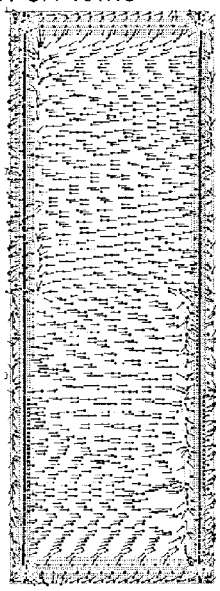
Figure 26:
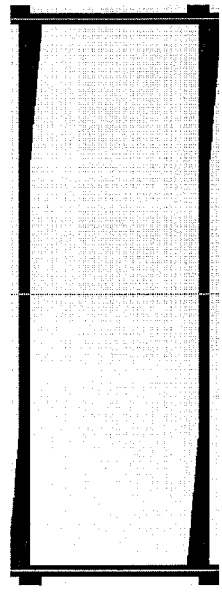
FIG. 26 Views illustrating the results of an orientation simulation when the cut-off angle is 5° and the cut-off ratio is 0.25.
Figure 26:
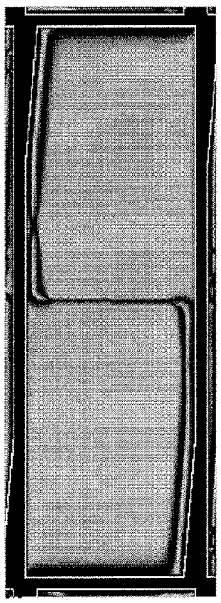
Figure 26:
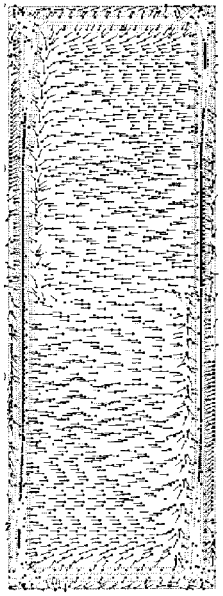
Figure 27:
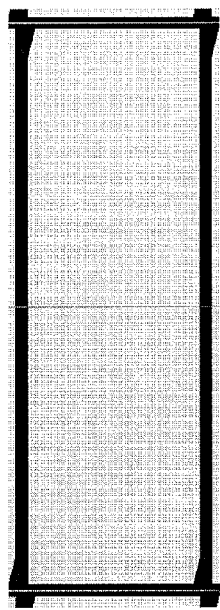
FIG. 27 Views illustrating the results of an orientation simulation when the cut-off angle is 15° and the cut-off ratio is 0.05.
Figure 27:
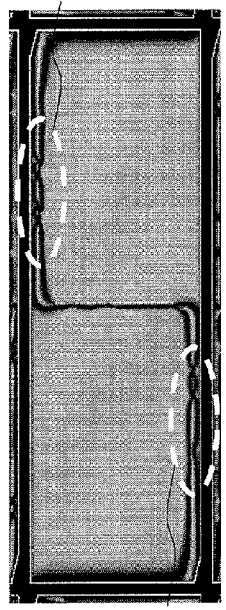
Figure 27:
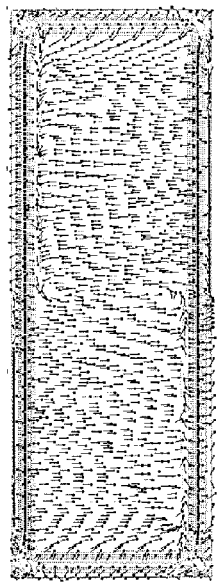
Figure 28:
FIG. 28 Views illustrating the results of an orientation simulation when the cut-off angle is 15° and the cut-off ratio is 0.10.
Figure 28:
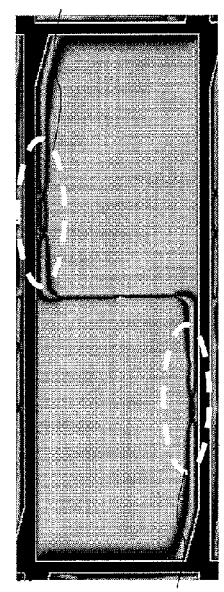
Figure 28:
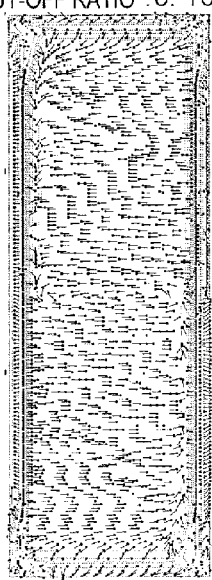
Figure 29:
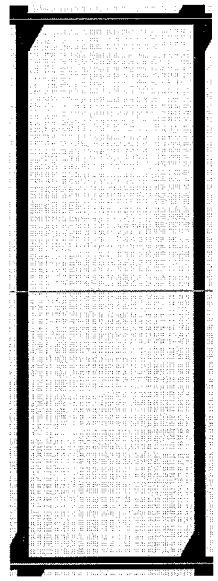
FIG. 29 Views illustrating the results of an orientation simulation when the cut-off angle is 30° and the cut-off ratio is 0.05.
Figure 29:
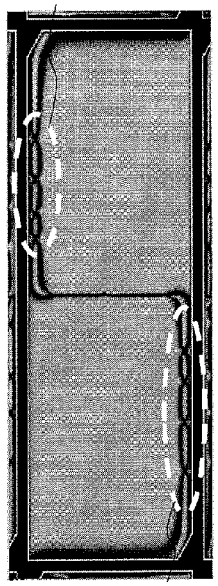
Figure 29:
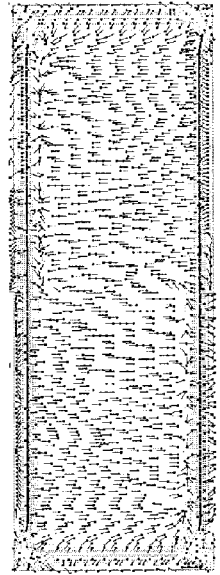
Figure 30:
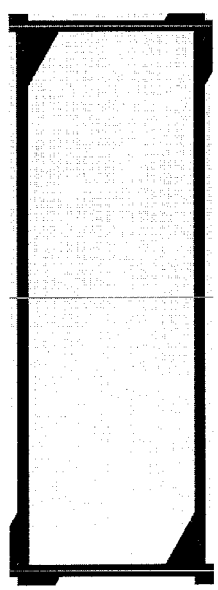
FIG. 30 Views illustrating the results of an orientation simulation when the cut-off angle is 30° and the cut-off ratio is 0.10.
Figure 30:
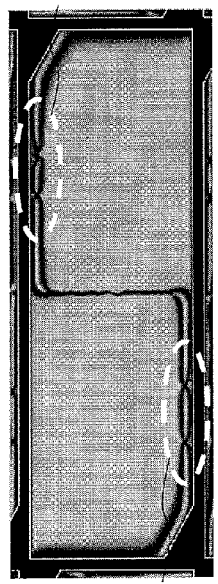
Figure 30:
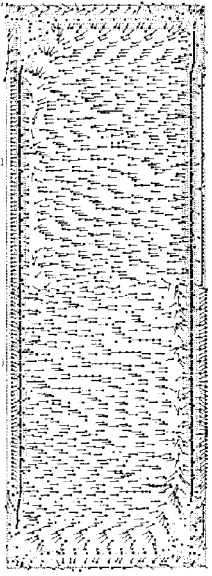
Figure 31:
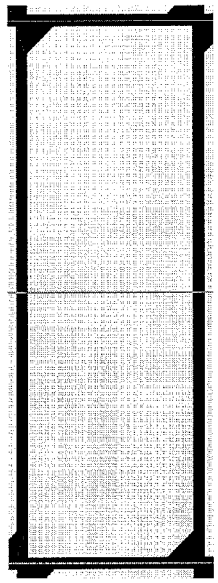
FIG. 31 Views illustrating the results of an orientation simulation when the cut-off angle is 45° and the cut-off ratio is 0.05.
Figure 31:
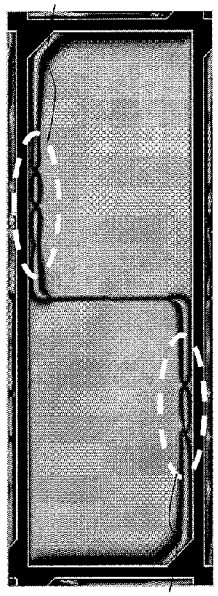
Figure 31:
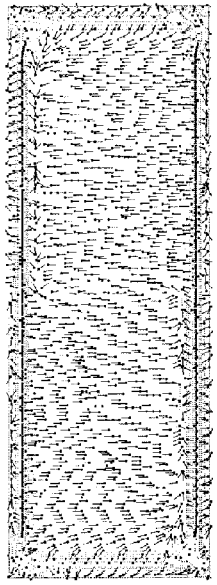
Figure 32:
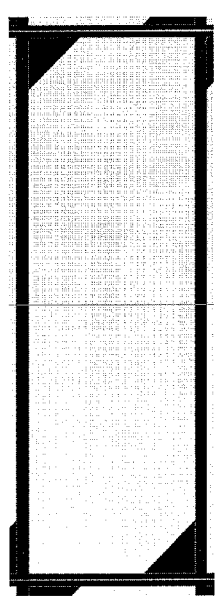
FIG. 32 Views illustrating the results of an orientation simulation when the cut-off angle is 45° and the cut-off ratio is 0.10.
Figure 32:
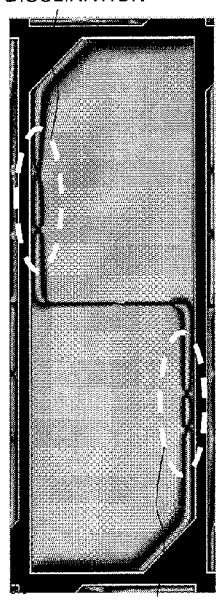
Figure 32:
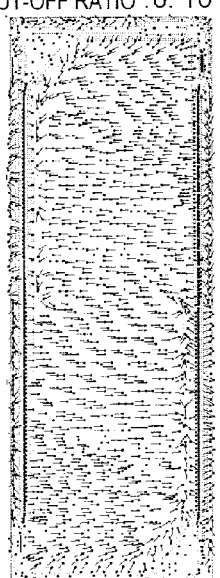

As can be seen from Table 2 and FIG. 19, a significant disclination occurred when the first cut-off portion 11a1 and the second cut-off portion 11a2 were not formed in the pixel electrode 11 (where the cut-off ratio was 0). As can be seen from Table 2, FIG. 22, FIG. 25 and FIG. 27 to FIG. 32, a disclination occurred albeit insignificantly when the cut-off ratio of the first cut-off portion 11a1 and the second cut-off portion 11a2 was 0.10 or less (although it exceeded 0). In contrast, as can be seen from Table 2, FIG. 20, FIG. 21, FIG. 23, FIG. 24 and FIG. 26, no disclination occurred when the cut-off ratio of the first cut-off portion 11a1 and the second cut-off portion 11a2 was 0.25 or more.

Thus, with the cut-off ratio of the first cut-off portion 11a1 and the second cut-off portion 11a2 being 0.25 or more, it is possible to more reliably suppress the occurrence of a disclination. The reason for this will now be described, referring to FIG. 33.

Figure 33:
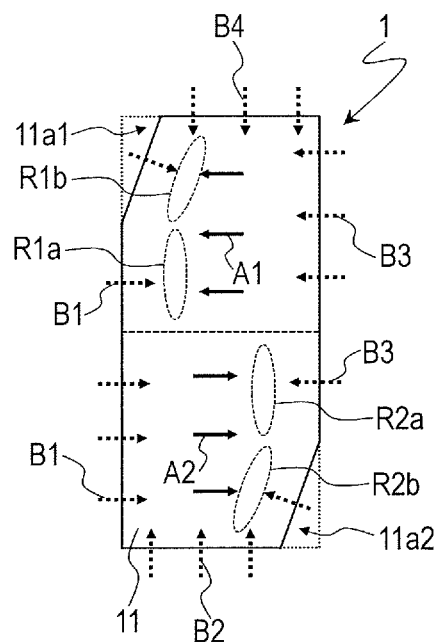
FIG. 33 A plan view schematically showing a pixel 1 of a liquid crystal display device 100 when the cut-off ratio is 0.25.

FIG. 33 shows a case where the cut-off ratio ($a_1/b$, $a_2/b$) is 0.25. One can assume that in this case, near the first edge portion 11e1, there is a region R1a where the orientation direction of the liquid crystal molecules 31 is not uniformly defined and a region R1b where the orientation direction of the liquid crystal molecules 31 is uniformly defined, where the region R1a and the region R1b are of the same size. Then, it is believed that the former region R1a is influenced by the latter region R1b so that the orientation direction of the liquid crystal molecules 31 is uniformly defined also in the former region R1a, and as a result, the orientation direction of the liquid crystal molecules 31 is uniformly defined near the entire first edge portion 11e1. Note that one may possibly assume that it is the latter region R1b that is influenced by the former region R1a, but it is believed that the orientation direction is uniformly defined when the cut-off ratio is 0.25 because the liquid crystal layer 30 is basically more stable energy-wise with no disclination.

Similarly, one can assume that near the second edge portion 11e2, there is a region R2a where the orientation direction of the liquid crystal molecules 31 is not uniformly defined and a region R2b where the orientation direction of the liquid crystal molecules 31 is uniformly defined, where the region R2a and the region R2b are of the same size. Then, it is believed that the former region R2a is influenced by the latter region R2b so that the orientation direction of the liquid crystal molecules 31 is uniformly defined also in the former region R2a, and as a result, the orientation direction of the liquid crystal molecules 31 is uniformly defined near the entire second edge portion 11e2.

It is believed that if the cut-off ratio is less than 0.25, in contrast, the influence of the regions R1a and R2a on the orientation of the liquid crystal molecules 31 may be greater than that of the regions R1b and R2b, and the orientation direction is less likely uniformly defined. The results shown in Table 2 are well in line with this assumption.

Note that as can be seen from the description above, the cut-off ratio of the first cut-off portion 11a1 being 0.25 or more ($a_1/b \geq 0.25$) means that the length $a_1$ of the first cut-off portion 11a1 is greater than or equal to one half of the length of the first edge portion 11e1. Similarly, the cut-off ratio of the second cut-off portion 11a2 being 0.25 or more ($a_2/b \geq 0.25$) means that the length $a_2$ of the second cut-off portion 11a2 is greater than or equal to one half of the length of the second edge portion 11e2.

As already described above, with the liquid crystal display device 100 of the present embodiment, as with the liquid crystal display device 900 of the reference example, there are formed four liquid crystal domains A, B, C and D, thereby realizing a high viewing angle characteristic. Now, the results of an orientation simulation and an optical simulation performed with various screen resolutions (pixel pitches) for verifying the viewing angle characteristic of the liquid crystal display device 900 of the reference example will be described.

The simulation was performed for six screen resolutions as Reference Examples 1 to 6. The simulation was also performed for the liquid crystal display device 1000 of a common 4D-RTN mode, as Comparative Example 1. The screen resolutions and the pixel pitches (pixel sizes) of Reference Examples 1 to 6 and Comparative Example 1 are as shown in Table 4 below. The simulation was performed, where the liquid crystal material was a nematic liquid crystal material having a refractive index anisotropy $\Delta n=0.1199$, and the thickness of the liquid crystal layer (the cell thickness) was 3.1 μm. Moreover, the interval between adjacent pixel electrodes was 6 μm, and the pre-tilt angle was 2.4°. A region where the photo-alignment film is exposed redundantly (a redundant exposure region) was formed with a width of 20 μm in the central portion of each pixel, and the pre-tilt angle at the center of the redundant exposure region was set to 0°. The white voltage (highest gray level voltage) was set to 3.9 V based on the measured values for an actual prototype 4.18-inch panel.

TABLE 4

|  |  | Screen resolution | Pixel pitch |
|---|---|---|---|
| Reference Example | 1 | 500 ppi | 16.93 μm × 50.8 μm |
|  | 2 | 400 ppi | 21.16 μm × 63.5 μm |
|  | 3 | 300 ppi | 28.25 μm × 84.75 μm |
|  | 4 | 217 ppi | 39 μm × 117 μm |
|  | 5 | 160 ppi | 52.91 μm × 158.75 μm |
|  | 6 | 96 ppi | 88.5 μm × 265.5 μm |
| Comparative Example 1 (4D-RTN) |  | 96 ppi | 88.5 μm × 265.5 μm |

Figure 34:
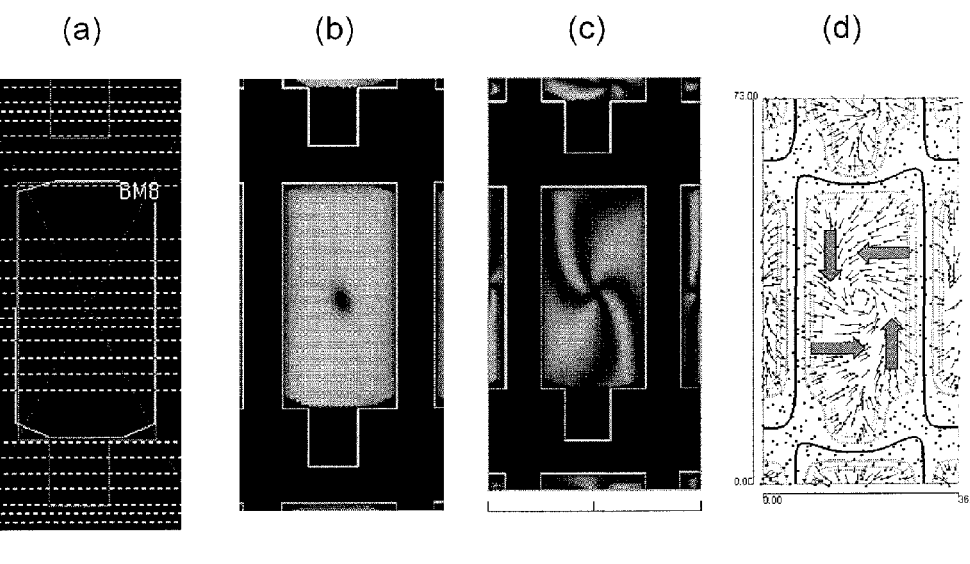
FIG. 34(*a*) to (*e*) are views illustrating the results of an orientation simulation and an optical simulation of Reference Example 1.
Figure 34:
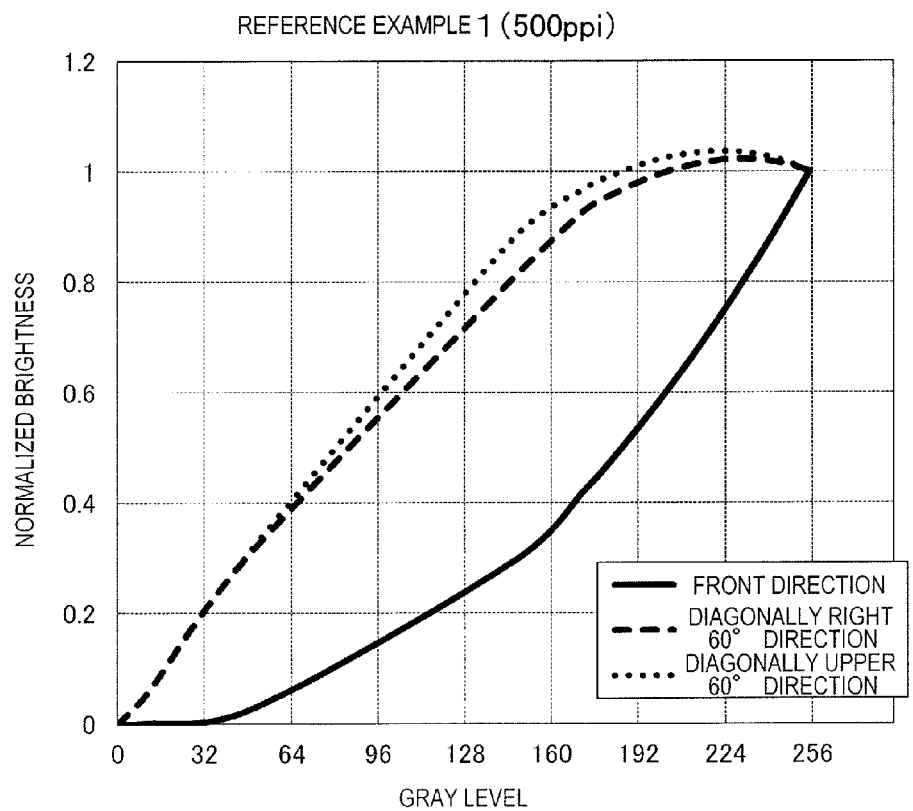
Figure 35:
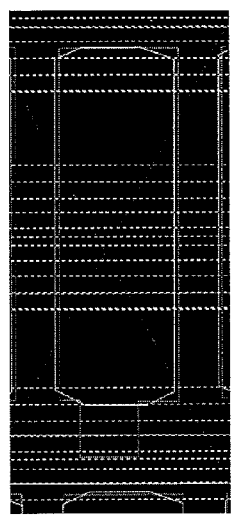
FIG. 35(*a*) to (*e*) are views illustrating the results of an orientation simulation and an optical simulation of Reference Example 2.
Figure 35:
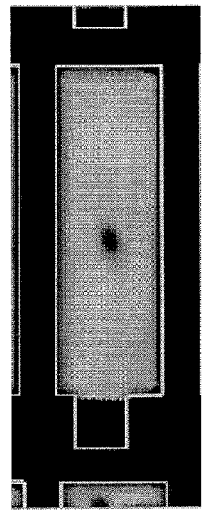
Figure 35:
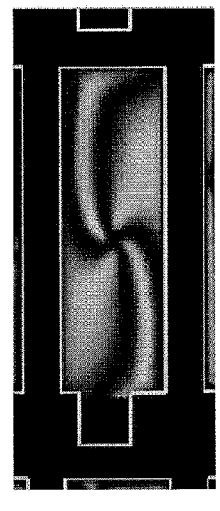
Figure 35:
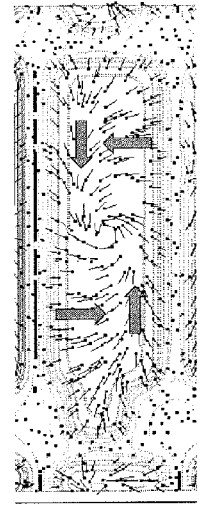
Figure 35:
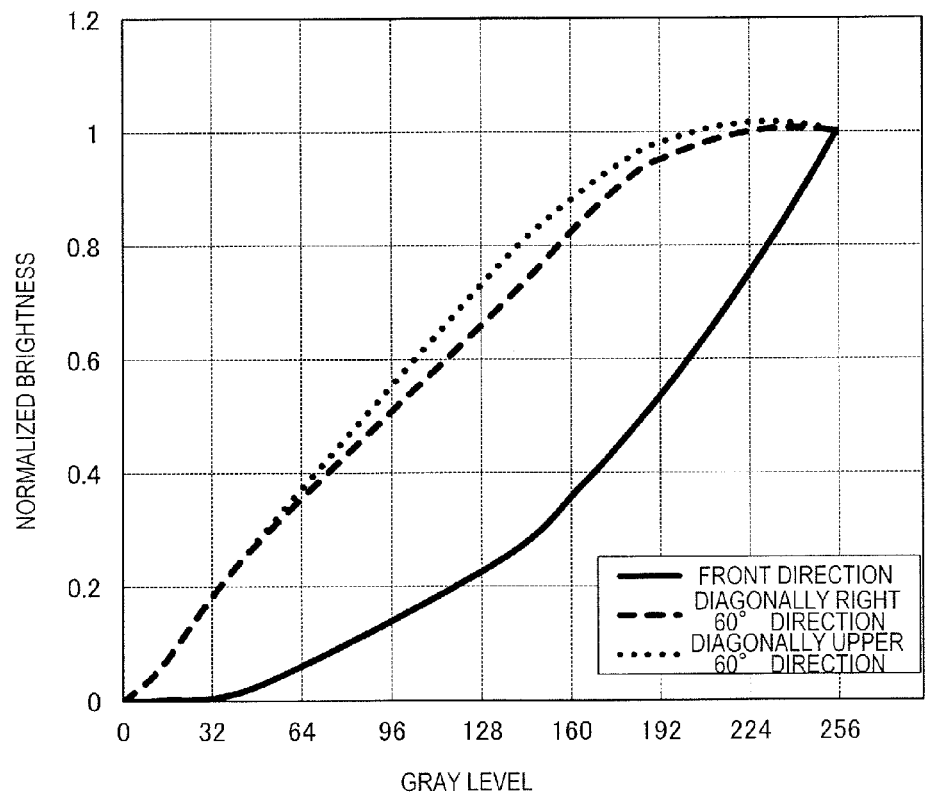
Figure 36:
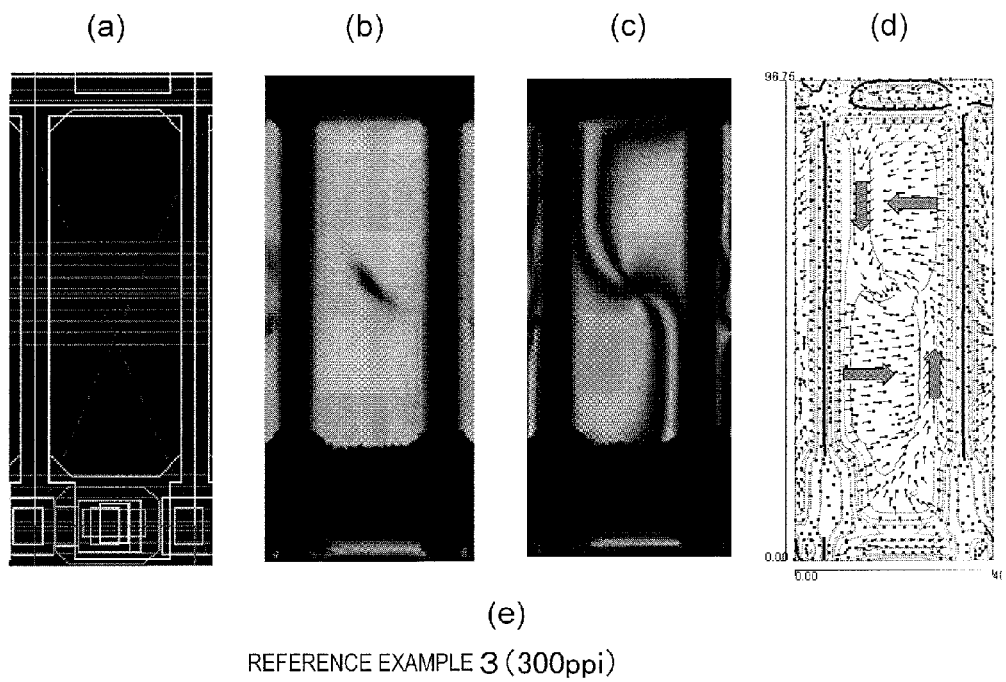
FIG. 36(*a*) to (*e*) are views illustrating the results of an orientation simulation and an optical simulation of Reference Example 3.
Figure 36:
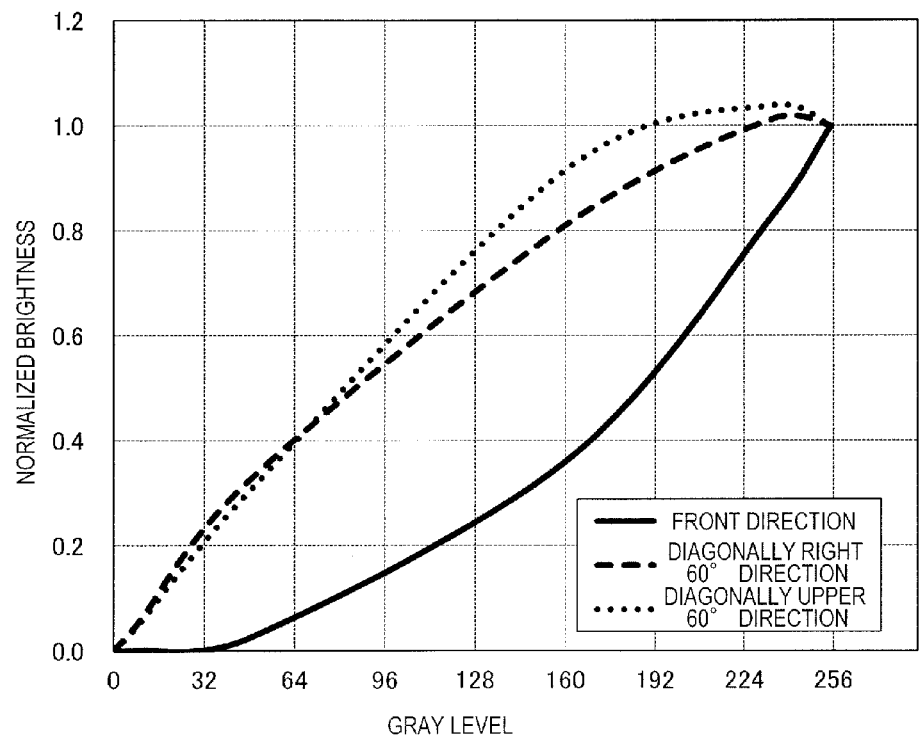
Figure 37:
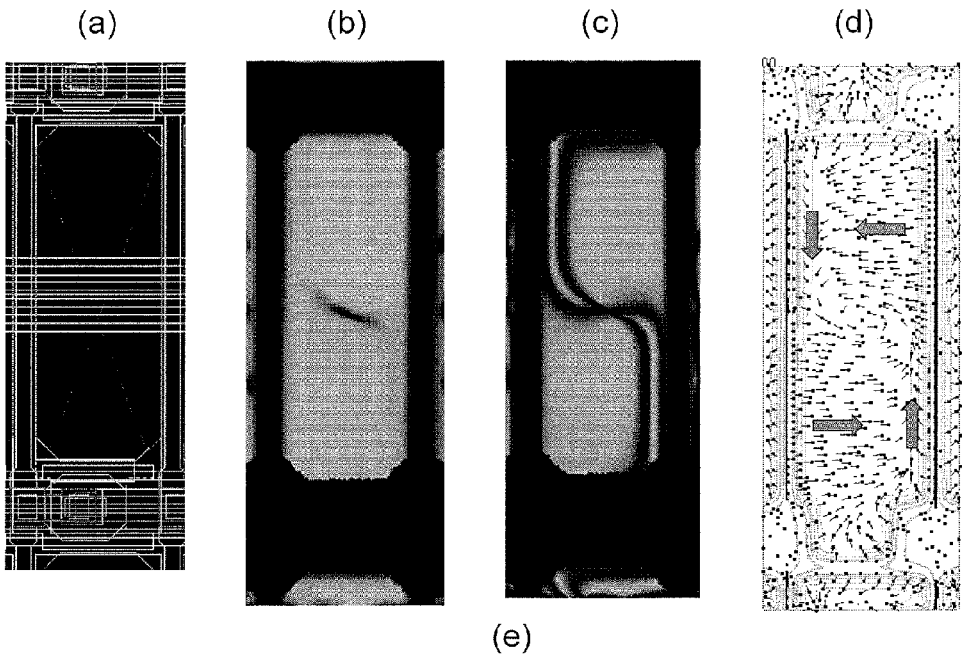
FIG. 37(*a*) to (*e*) are views illustrating the results of an orientation simulation and an optical simulation of Reference Example 4.
Figure 37:
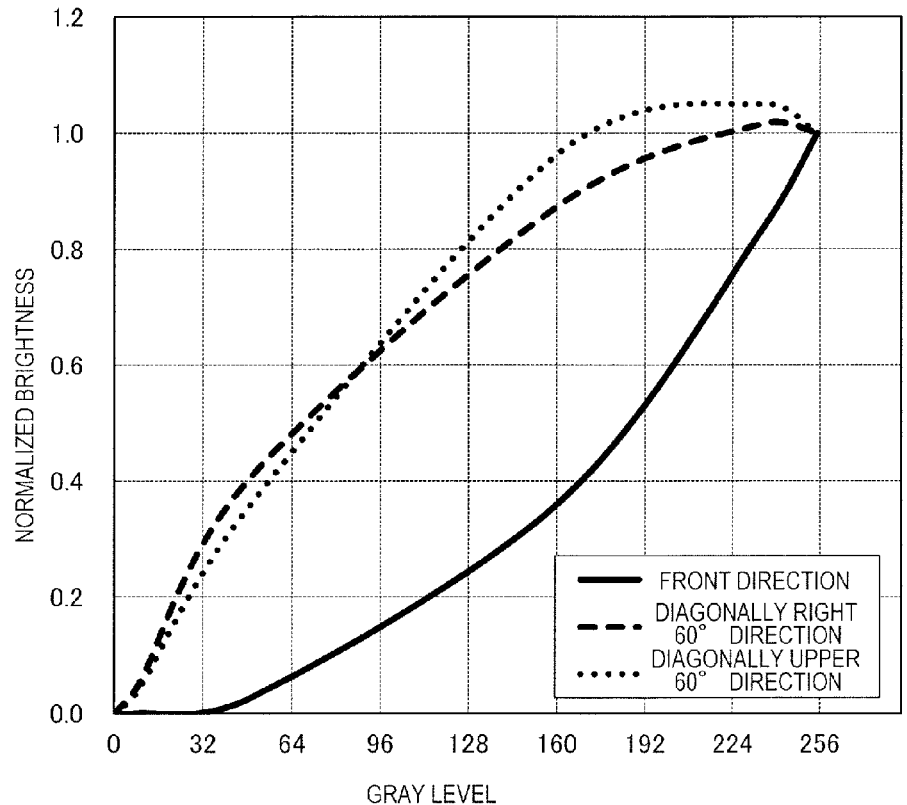
Figure 38:
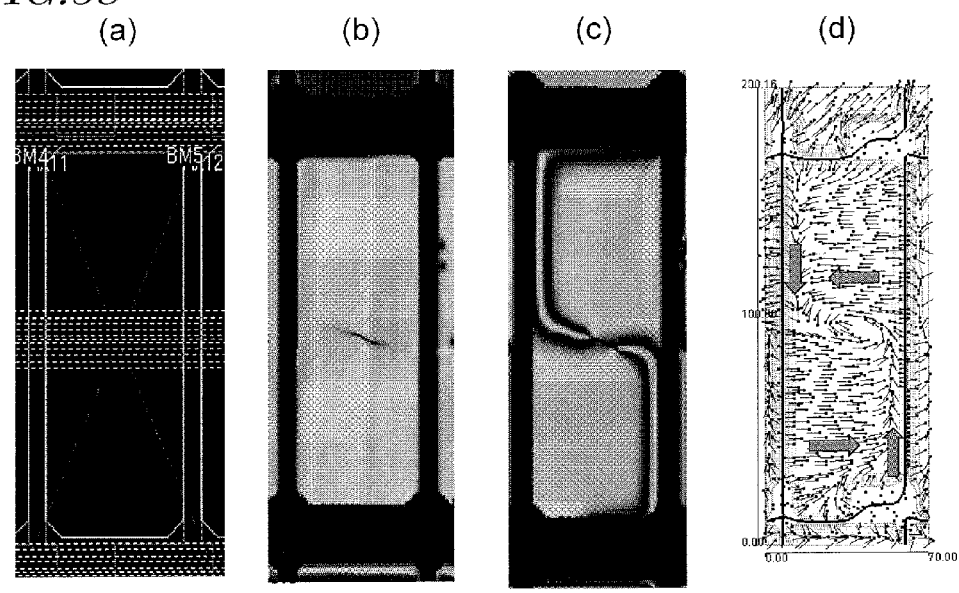
FIG. 38(*a*) to (*e*) are views illustrating the results of an orientation simulation and an optical simulation of Reference Example 5.
Figure 38:
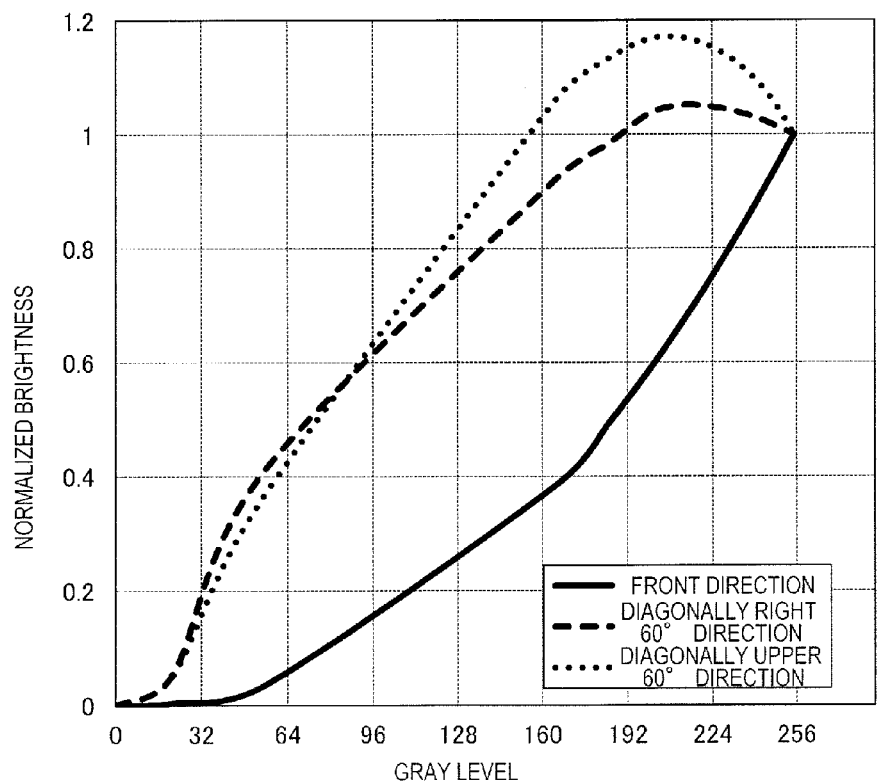

Referring to FIG. 34 to FIG. 40, simulation results for Reference Examples 1 to 6 and Comparative Example 1 will be described. FIG. 34 corresponds to Reference Example 1, FIG. 35 corresponds to Reference Example 2, and FIG. 36 corresponds to Reference Example 3. FIG. 37 corresponds to Reference Example 4, FIG. 38 corresponds to Reference Example 5, FIG. 39 corresponds to Reference Example 6, and FIG. 40 corresponds to Comparative Example 1.

In FIG. 34 to FIG. 40, (a) shows a calculation mask diagram. In FIG. 34 to FIG. 40, (b) shows transmittance simulation results obtained when circular polarizers are used as polarizers. In FIG. 34 to FIG. 40, (c) shows transmittance simulation results obtained when linear polarizers arranged so that the transmission axes are generally orthogonal to each other are used as polarizers. In FIG. 34 to FIG. 40, (d) shows the orientation distribution within a pixel, showing, by using an arrow, the general orientation direction of liquid crystal molecules (which can be said to be the azimuth direction of the director) in each liquid crystal domain. In FIG. 34 to FIG. 40, (e) is a graph showing the relationship between the gray level and the brightness (normalized with 1 being the brightness of the white display) as observed from the front direction, for a diagonally right 60° direction (the direction obtained by tilting the viewing angle by 60° rightward), and for a diagonally upper 60° direction (the direction obtained by tilting the viewing angle by 60° upward), indicating how much the γ characteristic (the gray level dependence of the brightness) shifts when observed from a diagonal direction than when observed from the front direction. Refer particularly to (e) of FIG. 34 to FIG. 40 in conjunction with the following description.

Figure 40:
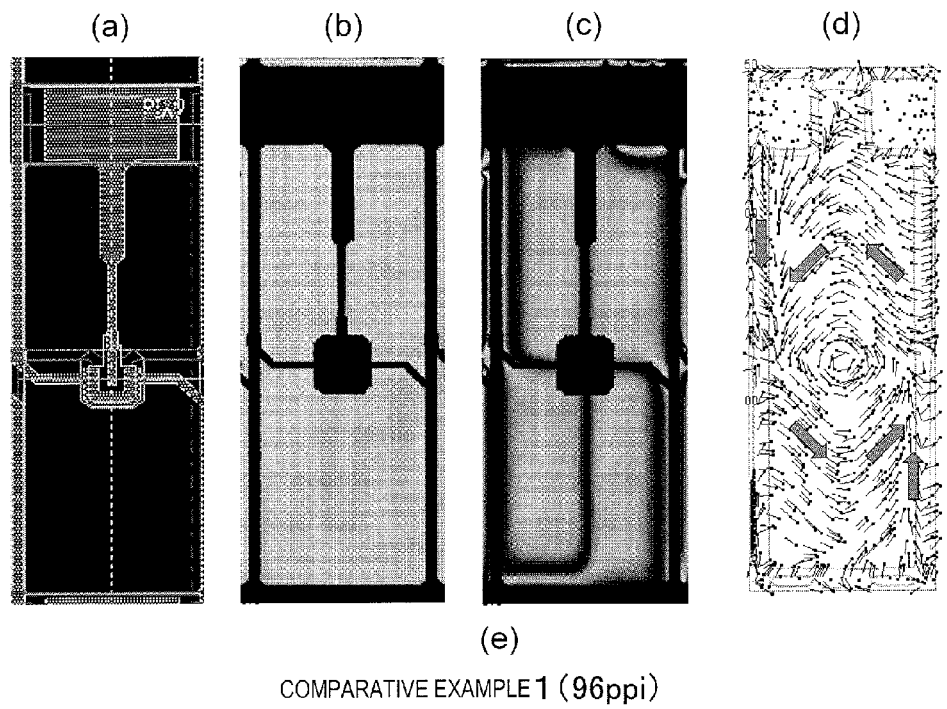
FIG. 40(*a*) to (*e*) are views illustrating the results of an orientation simulation and an optical simulation of Comparative Example 1.
Figure 40:
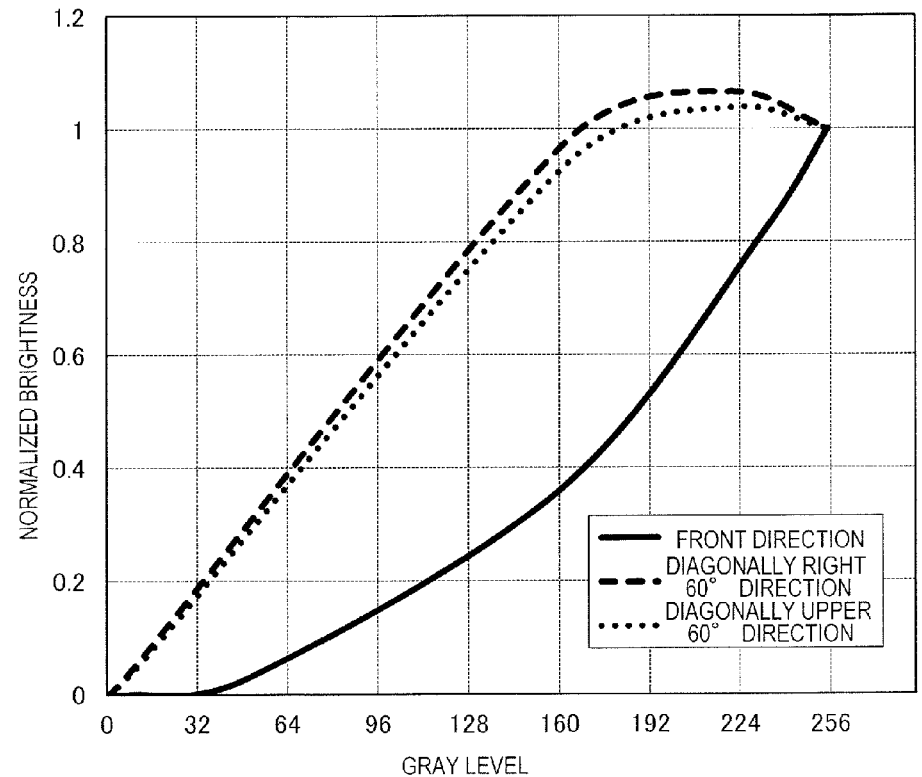

As can be seen from FIG. 40, in Comparative Example 1 (common 4D-RTN mode), even though the screen resolution is relatively low (96 ppi, with a pixel pitch of 88.5 µm×265.5 µm), there is substantially no brightness difference for substantially every gray level between when observed from the diagonally right 60° direction and when observed from the diagonally upper 60° direction. This indicates that a desirable viewing angle characteristic is obtained, i.e., there is a small azimuth angle dependence of the γ characteristic shift (γ shift) when observed from a diagonal direction.

Figure 39:
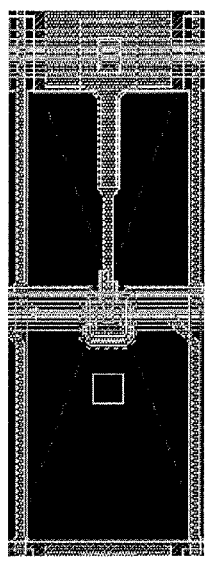
FIG. 39(*a*) to (*e*) are views illustrating the results of an orientation simulation and an optical simulation of Reference Example 6.
Figure 39:
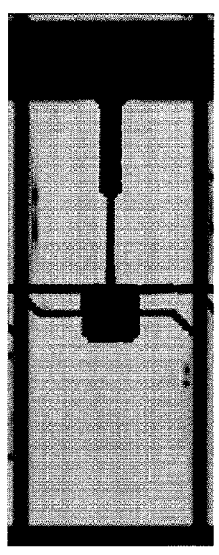
Figure 39:
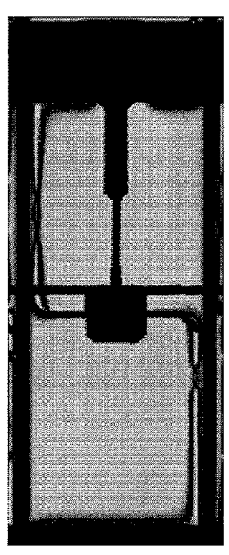
Figure 39:
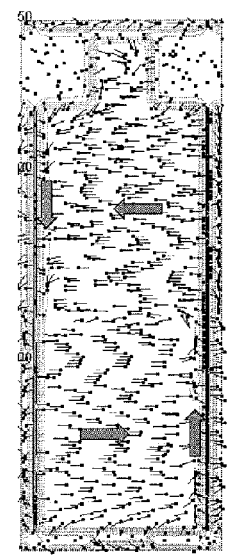
Figure 39:
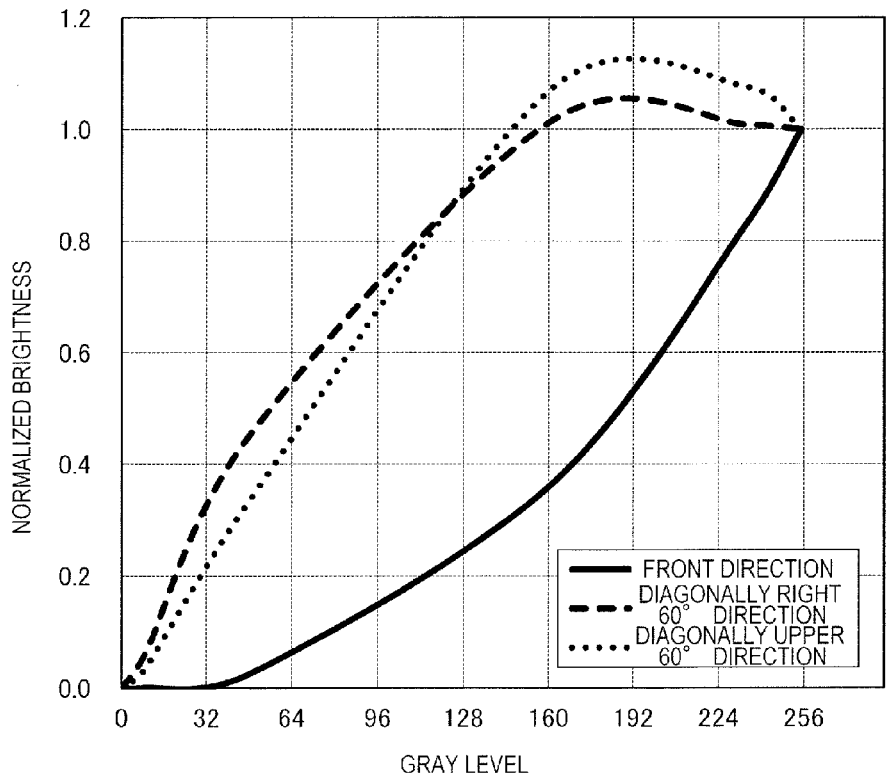

In contrast, as can be seen from FIG. 39, in Reference Example 6 where the screen resolution is the same as Comparative Example 1, the brightness difference between when observed from the diagonally right 60° direction and when observed from the diagonally upper 60° direction is greater than that for Comparative Example 1.

As can be seen from FIG. 34 to FIG. 39, in Reference Examples 1 to 6, the brightness difference between when observed from the diagonally right 60° direction and when observed from the diagonally upper 60° direction tends to decrease as the screen resolution increases (as the pixel pitch decreases). It can be seen that when the screen definition is 200 ppi or more (Reference Examples 1 to 4), the azimuth angle dependence of the γ shift is sufficiently small, thereby realizing a sufficiently high viewing angle characteristic.

Note that even though Reference Example 6 has a lower screen resolution than Reference Example 5, the brightness difference between when observed from the diagonally right 60° direction and when observed from the diagonally upper 60° direction is smaller than Reference Example 5. It is believed that this is because the calculation is done in Reference Example 6 using such a pattern that the inside of the pixel is partially shaded.

Figure 41:
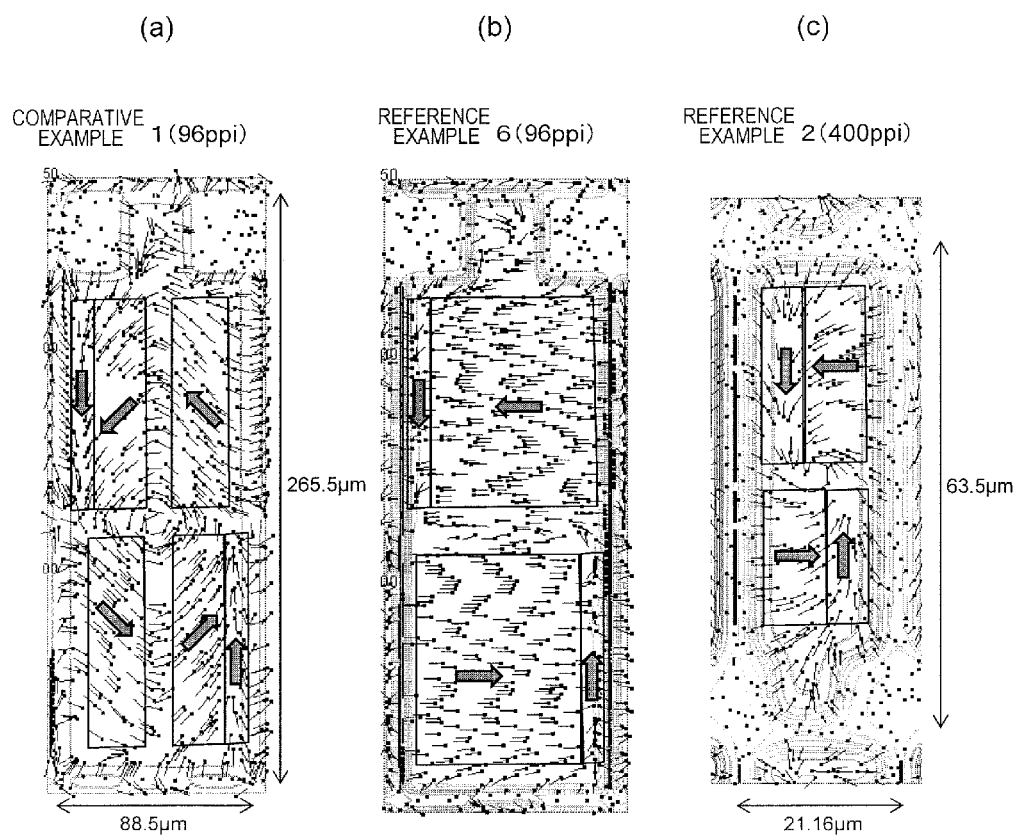
FIGS. 41(*a*), (*b*) and (*c*) are views, for Comparative Example 1, Reference Example 6 and Reference Example 2, respectively, each showing the orientation distribution within a pixel.

Then, referring now to FIGS. 41(a), (b) and (c), the reason why a higher viewing angle characteristic is realized as the screen resolution increases. FIGS. 41(a), (b) and (c) are enlarged versions of FIG. 40(d), FIG. 39(d) and FIG. 35(d), showing the orientation distribution within a pixel for Comparative Example 1, Reference Example 6 and Reference Example 2, respectively.

In Comparative Example 1, as can be seen from FIG. 41(a), four regions in which the liquid crystal molecules are oriented in the lower left direction (a generally 225° direction), the lower right direction (a generally 315° direction), the upper right direction (a generally 45° direction) and the upper left direction (a generally 135° direction) account for a majority of the pixel. Although regions in which the liquid crystal molecules are oriented in the downward direction (a generally 270° direction) and the upward direction (a generally 90° direction) are present in an upper left portion and a lower right portion of the pixel, these regions account for a small proportion of the pixel. Therefore, it can be regarded that the liquid crystal molecules are oriented generally in four directions within a pixel, and the four regions in which the liquid crystal molecules are oriented in the lower left direction, the lower right direction, the upper right direction and the upper left direction are dominant in terms of the optical characteristics.

In Reference Example 6, in contrast, as can be seen from FIG. 41(b), two regions in which the liquid crystal molecules are oriented in the left direction (a generally 180° direction) and the right direction (a generally 0° direction) account for a majority of the pixel. Although regions in which the liquid crystal molecules are oriented in the downward direction (a generally 270° direction) and the upward direction (a generally 90° direction) are present in an upper left portion and a lower right portion of the pixel, these regions account for a small proportion of the pixel. Therefore, it can be regarded that the liquid crystal molecules are oriented generally in two directions within a pixel, and the two regions in which the liquid crystal molecules are oriented in the left direction and the right direction are dominant in terms of the optical characteristics.

In Reference Example 2, in contrast, as can be seen from FIG. 41(c), regions in which the liquid crystal molecules are oriented in the downward direction and the upward direction account for a higher proportion of the pixel than in Reference Example 6. Therefore, it can be regarded that the liquid crystal molecules are oriented generally in four directions within a pixel, and the four regions in which the liquid crystal molecules are oriented in the downward direction, the right direction, the upward direction and the left direction (the four liquid crystal domains A, B, C and D) are dominant in terms of the optical characteristics.

As described above, as the screen resolution is higher (i.e., as the pixel pitch is smaller), the difference in area between the four liquid crystal domains decreases, improving the viewing angle characteristic. According to a study by the present inventors, it has been found that if the screen resolution is 200 ppi or more (if the shorter one of the pixel pitch along the display plane horizontal direction and the pixel pitch along the display plane vertical direction is 42 µm or less), the difference between the liquid crystal domain of the largest area and the liquid crystal domain of the smallest area can be made relatively small (specifically, 50% or less), and it is possible to realize a sufficiently high viewing angle characteristic comparable to that of a liquid crystal display device of a common 4D-RTN mode. Note that although verification results for the liquid crystal display device 900 of the reference example have been described above, they similarly apply also to the liquid crystal display device 100 of the present embodiment. That is, also with the liquid crystal display device 100 of the present embodiment, if the screen resolution is 200 ppi or more (if the shorter one of the pixel pitch along the display plane horizontal direction and the pixel pitch along the display plane vertical direction is 42 µm or less), it is possible to realize a sufficiently high viewing angle characteristic comparable to that of a liquid crystal display device of a common 4D-RTN mode.

Then, the results of measuring various characteristics of an actual prototype of a liquid crystal display device 900 having a screen resolution of 217 ppi as Reference Example 7 will be described. The results of measuring various characteristics of a prototype of a liquid crystal display device 1000 of a 4D-RTN mode having a screen resolution of 217 ppi as Comparative Example 2 and a prototype of a liquid crystal display device of a CPA (Continuous Pinwheel Alignment) mode having a screen resolution of 217 ppi as Comparative Example 3 will also be described. Note that the CPA mode is a type of the VA mode, and is disclosed in Japanese Laid-Open Patent Publication No. 2003-43525 and Japanese Laid-Open Patent Publication No. 2002-202511, for example.

Table 5 below shows the results of measuring the transmittance and the response speed for Reference Example 7, Comparative Example 2 and Comparative Example 3. As for the response speed, the rising response time Tr when changing the display gray level from 0 gray level to 32 gray level at 25° C., and the falling response time Td when changing it from 32 gray level to 0 gray level are shown. Table 5 also shows the temperature of the heating treatment in the re-alignment treatment step and the pre-tilt angle (average pre-tilt angle) for Reference Example 7 and Comparative Example 2. Note that two liquid crystal display devices 900 of different heating treatment temperatures were prototyped as Reference Example 7.

TABLE 5

|  | | Reference Example 7 | Comparative Example 2 (4D-RTN) | Comparative Example 3 (CPA) |
|---|---|---|---|---|
| Transmittance | | 6.6% | 6.6% | 6.4% |
| Heating treatment (re-alignment treatment) temperature | | 110° C. | 130° C. | 130° C. |
| Pre-tilt angle | | 2.0° | 1.4-1.5° | 0.9° |
| Response speed (25° C.) | Rising response time $T_r$ (0→32 gray level) | 51.9 msec | 59.4 msec | 116.6 msec | 53.8 msec |
| | Falling response time $T_d$ (32→0 gray level) | 9.0 msec | 8.6 msec | 10.3 msec | 10.2 msec |

As can be seen from Table 5, the rising response time Tr of Comparative Example 2 (4D-RTN mode) is longer (twice or more) than Comparative Example 3 (CPA mode). It is believed that this is because the proportion of the pixel accounted for by the undesirable tilt region increases, thereby reducing the average pre-tilt angle, as already described above.

In contrast, Reference Example 7 realizes substantially the same rising response time as that of Comparative Example 3. It is believed that this is because the lowering of the average pre-tilt angle is suppressed as already described above.

Reference Example 7 realizes a higher transmittance than that of Comparative Example 3. It is often the case with the CPA mode that an alignment regulating means (projections made of a dielectric material or openings made in the counter electrode) for fixing the center of the axially symmetric orientation to thereby stabilize the orientation is provided on the counter substrate side, and this alignment regulating means causes the lowering of the transmittance. In contrast, the liquid crystal display device 900 of the reference example does not require such an alignment regulating means, and it is therefore possible to realize a high transmittance. As with the liquid crystal display device 100 of the present embodiment, it is possible to realize a good response characteristic and a high transmittance.

Figure 42:
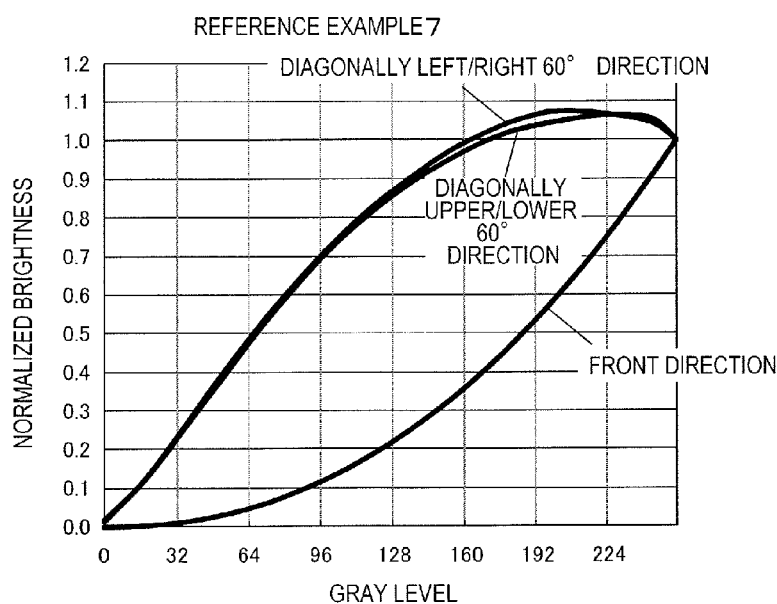
FIGS. 42(*a*) and (*b*) are graphs, for Reference Example 7 and Comparative Example 2, respectively, each showing the relationship between the gray level and the brightness (normalized brightness) when observed from the front direction, that when observed from a diagonally left/right 60° direction, and that when observed from a diagonally upper/lower 60° direction.
Figure 42:
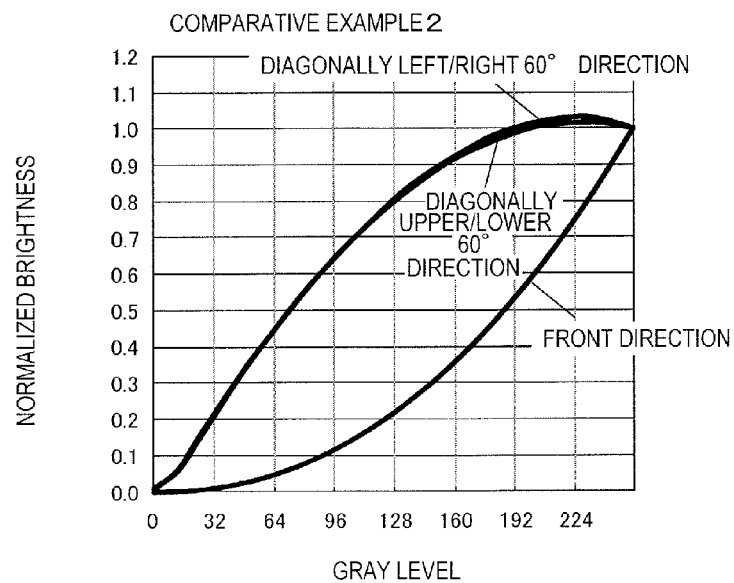

FIGS. 42(*a*) and (*b*) show, for Reference Example 7 and Comparative Example 2, the relationship between the gray level and the brightness (normalized brightness) when observed from the front direction, that when observed from the diagonally left/right 60° direction, and that when observed from the diagonally upper/lower 60° direction. As can be seen from FIGS. 42(*a*) and (*b*), the azimuth angle dependence of the γ shift was small and a sufficiently high viewing angle characteristic was realized in Reference Example 7, as in Comparative Example 2. Note that although not shown in the figures, a similarly high viewing angle characteristic to that of Comparative Example 2 was realized also in Comparative Example 3.

In Table 5 above, as can be seen from a comparison between two liquid crystal display devices 900 prototyped as Reference Example 7, a larger average pre-tilt angle can be obtained when the temperature of the heating treatment in the re-alignment treatment step is lower. Specifically, the heating treatment is preferably performed at 110° C. or less. Note however that the effect of the re-alignment treatment may not be sufficient with a temperature less than $T_{NI}+10°$ C. (where $T_{NI}$ is the nematic phase-isotropic phase transition temperature of the liquid crystal material), and it is therefore preferred that the heating treatment is $T_{NI}+10°$ C. or more.

Note that the reason why a higher average pre-tilt angle can be obtained when the temperature of the heating treatment is lower may be as follows.

It is believed that a pre-tilt angle is realized (a pre-tilt direction is defined) by a photo-alignment film because when a photo-alignment film (typically made of a polyimide-based material) is irradiated with ultraviolet light, the side chain turns toward where the ultraviolet light is coming in by virtue of a photoreaction of the photofunctional group. However, since this reaction is reversible with respect to heat, the pre-tilt angle returns to the original (before the photo-alignment treatment) pre-tilt angle (0°, or 90° with respect to the substrate plane) if the heating treatment in the re-alignment treatment step is performed at a high temperature over a long period of time. Therefore, it is believed that the heating treatment is preferably performed at a lower temperature.

Figure 43:
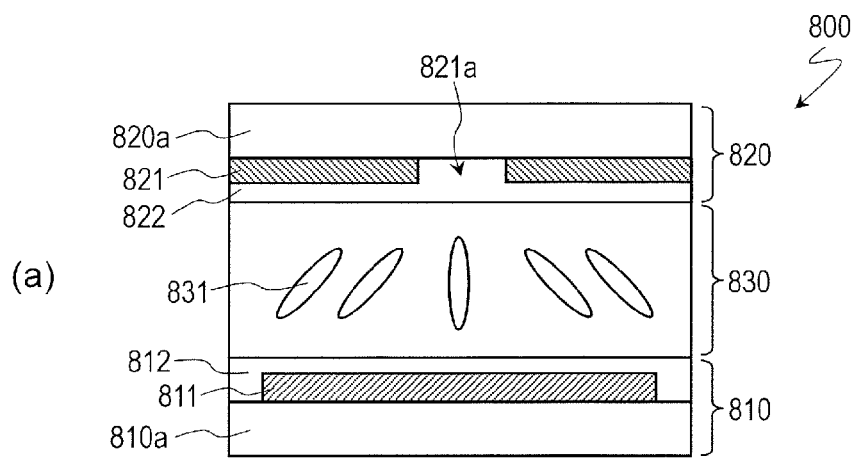
FIGS. 43(*a*) and (*b*) are a cross-sectional view and a plan view, respectively, schematically showing one pixel of a liquid crystal display device 800 of a CPA mode, and (c) is a view showing the simulation results for the transmittance when a white voltage is applied across a liquid crystal layer 830 of the liquid crystal display device 800.
Figure 43:
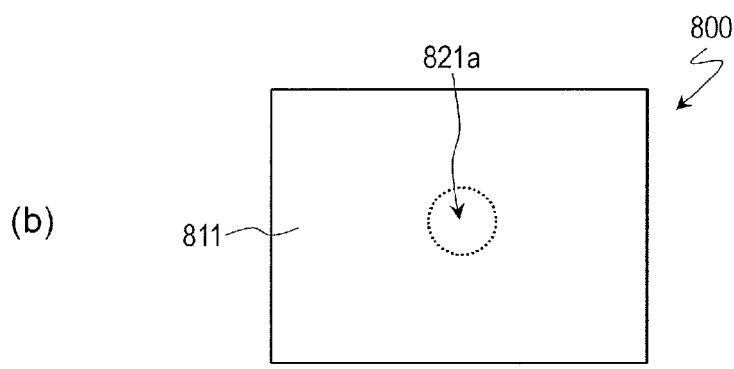
Figure 43:
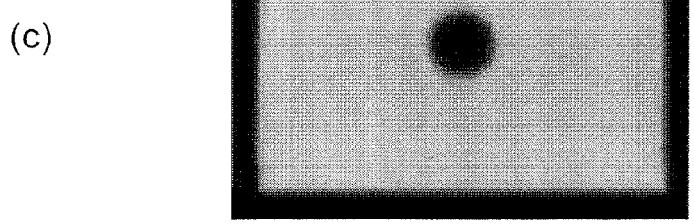

Now, referring to FIGS. 43(*a*) and (*b*), the basic structure of the CPA mode mentioned in Comparative Example 3 will be described. FIGS. 43(*a*) and (*b*) are a cross-sectional view and a plan view, respectively, schematically showing one pixel of a liquid crystal display device 800 of the CPA mode.

The liquid crystal display device 800 includes an active matrix substrate 810 and a counter substrate 820 arranged so as to oppose each other, and a liquid crystal layer 830 of a vertical alignment type provided therebetween.

The active matrix substrate 810 includes a pixel electrode 811 provided in each pixel, and a vertical alignment film 812 provided between the pixel electrode 811 and the liquid crystal layer 830. The pixel electrode 811 and the vertical alignment film 812 are supported on a transparent substrate 810*a*.

The counter substrate 820 includes a counter electrode 821 opposing the pixel electrode 811, and a vertical alignment film 822 provided between the counter electrode 821 and the liquid crystal layer 830. The counter electrode 821 and the vertical alignment film 822 are supported on a transparent substrate 820*a*. The counter electrode 821 has an opening 821*a* formed in a region opposing generally the center of the pixel electrode 811.

When a voltage is applied across the liquid crystal layer 830, liquid crystal molecules 831 are oriented in an axially symmetric orientation, as shown in FIGS. 43(*a*) and (*b*), by the alignment regulating force of an oblique electric field produced in the vicinity of the outer perimeter of the pixel electrode 811 and the alignment regulating force of an oblique electric field produced in the vicinity of the opening 821*a* of the counter electrode 821.

The opening 821*a* of the counter electrode 821 functions to fix the center of the axially symmetric orientation and to stabilize the orientation. As an alignment regulating means having such a function, a projection (referred to also as a rivet) made of a dielectric material may also be used instead of the opening 821*a* of the counter electrode 821. Note however that since the liquid crystal molecules 831 in the vicinity of the alignment regulating means tend not to tilt in the presence of an applied voltage, thereby lowering the brightness. FIG. 43(*c*) shows the transmittance simulation results when a white voltage is applied across the liquid crystal layer 830 of the liquid crystal display device 800 (including circular polarizers as polarizers). As can be seen from FIG. 43(c), a region corresponding to the opening 821a of the counter electrode 821 appears dark, lowering the brightness.

In order to suppress such lowering of the brightness, one may consider reducing the size of the alignment regulating means itself (typically about 10 µm in diameter for the opening 821a formed in the counter electrode 821). However, when the size of the alignment regulating means is reduced, it may become impossible to sufficiently stabilize the orientation due to an insufficient alignment regulating force. Moreover, in order to form a minute alignment regulating means, it is necessary to introduce a new piece of equipment such as a high-resolution stepper.

Therefore, since the size of the alignment regulating means cannot be reduced below a certain level, if the pixel pitch decreases due to an increase in the definition, it will increase the proportion of the entire pixel accounted for by the alignment regulating means for fixing the center. While the CPA mode at present is often employed in medium- to small-size liquid crystal display devices, the brightness will be low, with liquid crystal display devices of the CPA mode, if the pixel pitch decreases due to an increase in the definition, for the reason described above.

In contrast, with the liquid crystal display device 900 of the reference example, particularly when circular polarizers are used as polarizers, there is little loss of the brightness and it is possible to realize a high transmittance, as can be seen from FIG. 8(c), etc. This similarly applies to the liquid crystal display device 100 of the present embodiment.

As already described above, it is believed that the response speed of the liquid crystal display device 900 of the reference example and the liquid crystal display device 100 of the present embodiment improves because the area of the undesirable tilt region NGR is smaller than a liquid crystal display device of the 4D-RTN mode. The results of a test by the present inventors checking whether or not undesirable tilt regions NGR are actually formed due to the optical diffraction phenomenon, and the widths of the undesirable pre-tilt regions NGR if they are actually formed will be described below.

Figure 44:
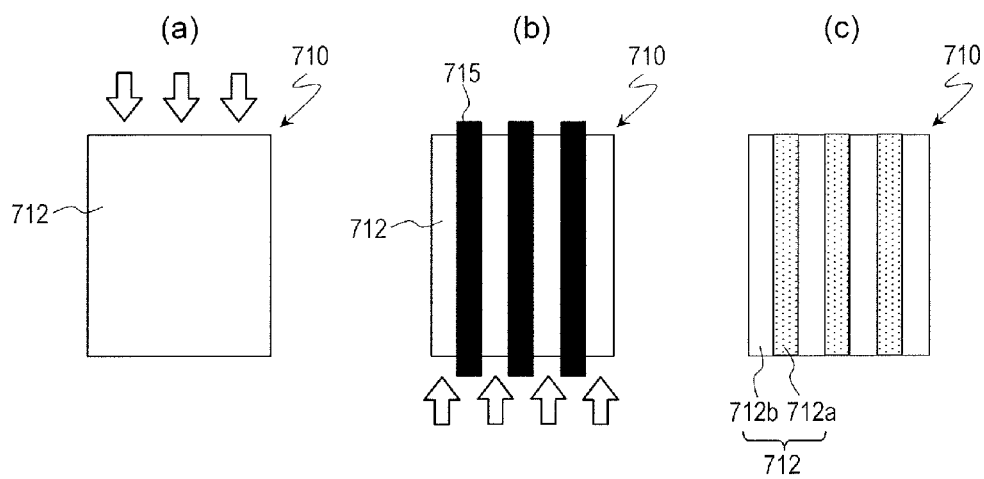
FIGS. 44(*a*), (*b*) and (*c*) are diagrams showing the results of verifying the formation of an undesirable tilt region NGR due to the optical diffraction phenomenon.

First as shown in FIG. 44(a), a substrate 710 with a photo-alignment film 712 formed thereon is prepared, and the photo-alignment film 712 of the substrate 710 is irradiated with ultraviolet light from a direction indicated by an arrow.

Next, as shown in FIG. 44(b), irradiation with ultraviolet light was done from a direction indicated by an arrow (the opposite direction from the direction shown in FIG. 44(a)) with some regions of the photo-alignment film 712 being shaded by a photomask including light-blocking portions 715 arranged in a stripe pattern.

Through two exposures as described above, a region (first region) 712a, which has been irradiated only once with ultraviolet light, and a region (second region) 712b, which has been irradiated twice with ultraviolet light, are formed on the photo-alignment film 712, as shown in FIG. 44(c). The first region 712a became, through irradiation with ultraviolet light in the first exposure step, a region where a large pre-tilt angle (specifically, 2.5°) can be realized. In contrast, the second region 712b was more influenced by irradiation with ultraviolet light in the second exposure step, of the two exposure steps in which irradiation with ultraviolet light is done from opposite directions, and the second region 712b became a region where a small pre-tilt angle (specifically, −0.5°) can be realized.

Figure 45:
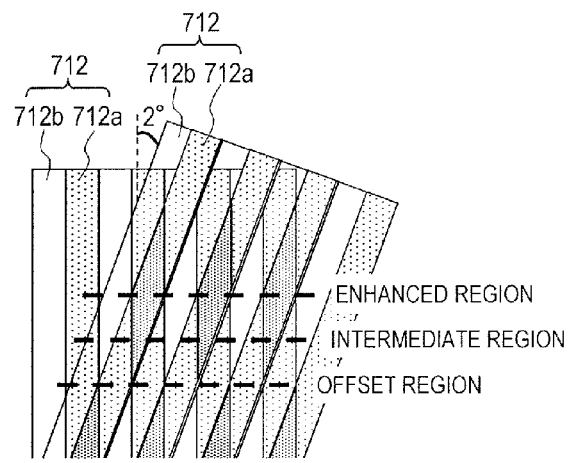
FIG. 45 A diagram illustrating the results of verifying the formation of the undesirable tilt region NGR due to the optical diffraction phenomenon.

Two substrates 710 with two different regions 712a and 712b formed on the photo-alignment film 712 were prepared, and they were attached together while being misaligned with each other by a predetermined angle (herein, 2°), as shown in FIG. 45. As for cross sections (taken along broken lines shown in the figure) of the panel obtained through the attachment process, there are a cross section (referred to as an "enhanced region") including regions where the first regions 712a oppose each other and regions where the second regions 712b oppose each other, a cross section (referred to as an "offset region") only including regions where the first region 712a and the second region 712b oppose each other, and a cross section (referred to as an "intermediate region") where those regions coexist.

Figure 46:
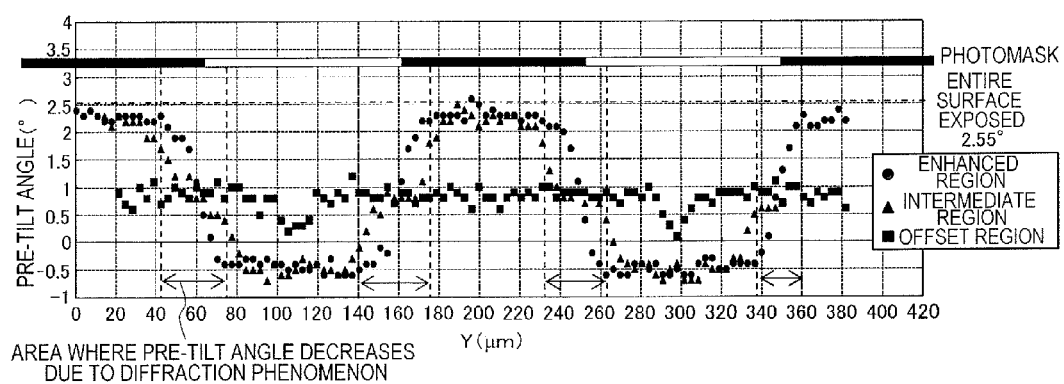
FIG. 46 A graph showing the position profile along the direction Y of the pre-tilt angle (the left-right direction of FIG. 45) for the enhanced region, the intermediate region and the offset region.

FIG. 46 shows the position profile of the pre-tilt angle along the direction Y (the left-right direction in FIG. 45) for each of the enhanced region, the intermediate region and the offset region. Now, in order to check the influence of the diffraction of light, the pre-tilt angle in the enhanced region will be discussed. FIG. 46 also shows positions of the light-blocking portions and the light-transmitting portions of the photomask. Note that the pre-tilt angle is 2.55° when the entire surface is exposed only once without using a photomask.

As can be seen from FIG. 46, the pre-tilt angle changes from 2.5° to −0.5° in each region which has a width of about 20 to 40 µm and which is centered about the boundary between the light-blocking portion and the light-transmitting portion of the photomask. Thus, there actually are regions where the pre-tilt angle lowers due to the optical diffraction phenomenon. Therefore, as with the liquid crystal display device 900 of the reference example and the liquid crystal display device 100 of the present embodiment, the entire boundary BD1 between the first pre-tilt region 12a and the second pre-tilt region 12b of the first photo-alignment film 12 and the entire boundary BD2 between the third pre-tilt region 22a and the fourth pre-tilt region 22b of the second photo-alignment film 22 can be aligned with each other to reduce the area of the undesirable tilt region NGR, thereby suppressing the lowering of the average pre-tilt angle of the entire pixel.

Figure 47:
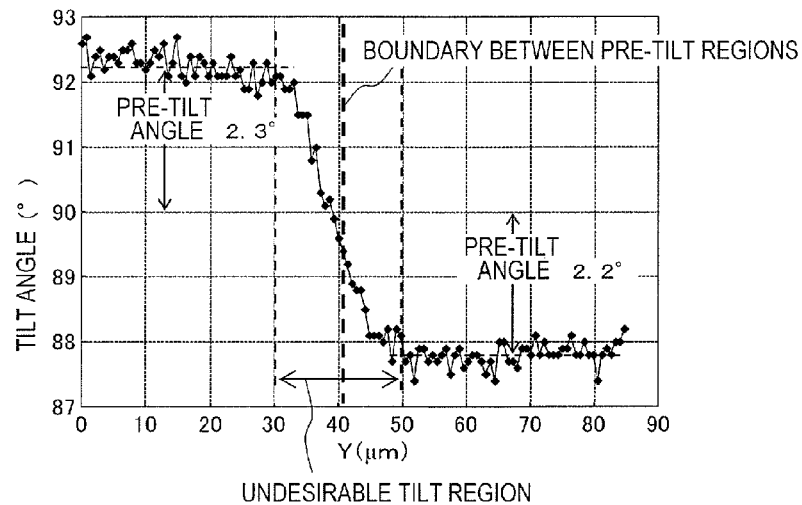
FIGS. 47(*a*) and (*b*) are graphs, for two liquid crystal display devices 900 prototyped as Example 7, each showing the distribution of the pre-tilt angle within a pixel 901.
Figure 47:
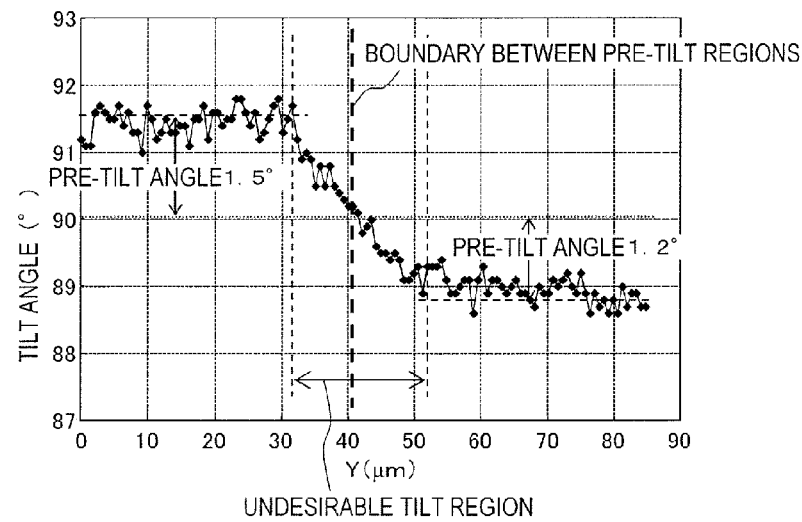
Figure 48:
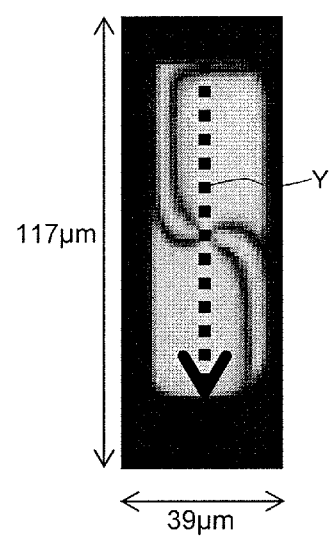
FIG. 48 An optical microscope image of one pixel 901 of Reference Example 7.

Then, the results of measuring the distribution of the pre-tilt angle within a pixel 901, for two liquid crystal display devices 900 prototyped as Reference Example 7 (screen resolution: 217 ppi, pixel pitch: 39 µm×117 µm), will be described. FIGS. 47(a) and (b) are graphs showing the relationship between the position in the pixel 901 and the pre-tilt angle, for a case where the temperature of the heating treatment in the re-alignment treatment step is 110° C. and for a case where it is 130° C., respectively (the time is 40 min for both cases). Note that the vertical axis of the graphs of FIGS. 47(a) and (b) represents the tilt angle with respect to the substrate plane. The measurement of the pre-tilt angle was done along the direction Y shown in FIG. 48. FIG. 48 is an optical microscope image corresponding to one pixel 901.

It can be seen from FIGS. 47(a) and (b) that a region which has a width of about 20 µm and which is centered about the boundary between pre-tilt regions has become a region where a sufficient pre-tilt angle cannot be realized (undesirable tilt region), but a sufficiently large pre-tilt angle can be realized in other regions.

It can be seen from a comparison between FIG. 47(a) and FIG. 47(b) that a larger pre-tilt angle can be realized when the temperature of the heating treatment in the re-alignment treatment step is lower.

Note that the description of the present embodiment is directed to a case where the first photo-alignment film 12 and the second photo-alignment film 22 are divided into two regions in the up-down direction in each pixel 1, and the first pre-tilt direction PD1, the second pre-tilt direction PD2, the third pre-tilt direction PD3 and the fourth pre-tilt direction PD4 are generally parallel to the left-right direction of the display plane, as shown in FIGS. 5(a) and (b). However, the form of alignment division is not limited to those illustrated above. For example, where each pixel has an horizontally-elongated shape (the length of the pixel along the display plane left-right direction is greater than the length of the pixel along the display plane up-down direction), the first photo-alignment film 12 and the second photo-alignment film 22 may be divided into two regions in the left-right direction in each pixel 1 so that the first pre-tilt direction PD1, the second pre-tilt direction PD2, the third pre-tilt direction PD3 and the fourth pre-tilt direction PD4 are generally parallel to the up-down direction of the display plane.

Although the present embodiment is directed to a case where one color display pixel is formed by three pixels and the aspect ratio of one pixel is 3:1, the number of pixels to be included in one color display pixel and the aspect ratio of one pixel are not limited to those illustrated herein.

INDUSTRIAL APPLICABILITY

An embodiment of the present invention is directed to a liquid crystal display device of a VA mode which is suitable for higher-definition applications, and in which the pre-tilt direction of liquid crystal molecules is defined by a photo-alignment film.

REFERENCE SIGNS LIST

1 Pixel
10 Active matrix substrate
11 Pixel electrode
11$a_1$ First cut-off portion
11$a_2$ Second cut-off portion
11$e_1$ First edge portion
11$e_2$ Second edge portion
12 First photo-alignment film
12a First pre-tilt region
12b Second pre-tilt region
18, 28 Polarizer (linear polarizer)
20 Counter substrate
21 Counter electrode
22 Second photo-alignment film
22a Third pre-tilt region
22b Fourth pre-tilt region
30 Liquid crystal layer
31 Liquid crystal molecules
100 Liquid crystal display device
e1 Direction which is orthogonal to first edge portion and which extends toward inside of pixel electrode
e2 Direction which is orthogonal to second edge portion and which extends toward inside of pixel electrode
A, B, C, D Liquid crystal domain
BD1 Boundary between first pre-tilt region and second pre-tilt region
BD2 Boundary between third pre-tilt region and fourth pre-tilt region
NGR, NGR1, NGR2 Undesirable tilt region
PD1 First pre-tilt direction
PD2 Second pre-tilt direction
PD3 Third pre-tilt direction
PD4 Fourth pre-tilt direction
P1, P2 Transmission axis of linear polarizer

The invention claimed is:

1. A liquid crystal display device including a plurality of pixels arranged in a matrix pattern, the liquid crystal display device comprising:
    a first substrate and a second substrate arranged so as to oppose each other; and
    a liquid crystal layer of a vertical alignment type provided between the first substrate and the second substrate, wherein:
    the first substrate includes a pixel electrode provided in each of the plurality of pixels, and a first photo-alignment film provided between the pixel electrode and the liquid crystal layer;
    the second substrate includes a counter electrode opposing the pixel electrode, and a second photo-alignment film provided between the counter electrode and the liquid crystal layer;
    the first photo-alignment film has, in each of the plurality of pixels, a first pre-tilt region defining a first pre-tilt direction, and a second pre-tilt region defining a second pre-tilt direction, which is anti-parallel to the first pre-tilt direction;
    the second photo-alignment film has, in each of the plurality of pixels, a third pre-tilt region defining a third pre-tilt direction, and a fourth pre-tilt region defining a fourth pre-tilt direction, which is anti-parallel to the third pre-tilt direction;
    as seen from a display plane normal direction, an entire boundary between the first pre-tilt region and the second pre-tilt region of the first photo-alignment film and an entire boundary between the third pre-tilt region and the fourth pre-tilt region of the second photo-alignment film are aligned with each other;
    an outer perimeter of the pixel electrode includes a first edge portion and a second edge portion;
    a direction which is orthogonal to the first edge portion and which extends toward inside of the pixel electrode is opposite to the first pre-tilt direction;
    a direction which is orthogonal to the second edge portion and which extends toward inside the pixel electrode is opposite to the second pre-tilt direction; and
    the pixel electrode includes a first cut-off portion provided by cutting off at least a part of the first edge portion, and a second cut-off portion provided by cutting off at least a part of the second edge portion.

2. The liquid crystal display device according to claim 1, wherein:
    the first cut-off portion has a right triangle shape obtained by cutting off a corner of the pixel electrode in the vicinity of the first edge portion; and
    the second cut-off portion has a right triangle shape obtained by cutting off a corner of the pixel electrode in the vicinity of the second edge portion.

3. The liquid crystal display device according to claim 2, wherein:
    where $a_1$, $a_2$ and b denote lengths of the first cut-off portion, the second cut-off portion and the pixel electrode, respectively, along a direction orthogonal to the first pre-tilt direction and the second pre-tilt direction, the length $a_1$ of the first cut-off portion, the length $a_2$ of the second cut-off portion and the length b of the pixel electrode satisfy relationships $a_1/b \geq 0.25$ and $a_2/b \geq 0.25$.

4. The liquid crystal display device according to claim 3, wherein the length $a_1$ of the first cut-off portion, the length $a_2$ of the second cut-off portion and the length b of the pixel electrode satisfy relationships $a_1/b \leq 0.5$ and $a_2/b \leq 0.5$.

5. The liquid crystal display device according to claim 2, wherein an angle $\phi_1$ formed between a hypotenuse of the first cut-off portion and the first edge portion and an angle $\phi_2$ formed between a hypotenuse of the second cut-off portion and the second edge portion satisfy relationships $\phi_1 \geq 1°$ and $\phi_2 \geq 1°$.

6. The liquid crystal display device according to claim 1, wherein:
   as seen from the display plane normal direction, the first pre-tilt region of the first photo-alignment film and the third pre-tilt region of the second photo-alignment film are aligned with each other and the second pre-tilt region of the first photo-alignment film and the fourth pre-tilt region of the second photo-alignment film are aligned with each other; and
   the third pre-tilt direction is anti-parallel to the first pre-tilt direction, and the fourth pre-tilt direction is anti-parallel to the second pre-tilt direction.

7. The liquid crystal display device according to claim 1, wherein:
   when a voltage is applied between the pixel electrode and the counter electrode, four liquid crystal domains are formed in the liquid crystal layer in each of the plurality of pixels; and
   azimuth directions of four directors representing orientation directions of liquid crystal molecules included in the four liquid crystal domains, respectively, are different from each other.

8. The liquid crystal display device according to claim 1, further comprising:
   a pair of linear polarizers which are arranged so as to oppose each other with the liquid crystal layer interposed therebetween and so that transmission axes thereof are generally orthogonal to each other,
   wherein the transmission axes of the pair of linear polarizers form an angle of generally 45° with respect to the first pre-tilt direction.

9. The liquid crystal display device according to claim 1, further comprising a pair of circular polarizers opposing each other with the liquid crystal layer interposed therebetween.

10. The liquid crystal display device according to claim 1, wherein the liquid crystal layer includes liquid crystal molecules having a negative dielectric anisotropy.

11. The liquid crystal display device according to claim 1, wherein a shorter one of a pixel pitch along a display plane horizontal direction and a pixel pitch along a display plane vertical direction is 42 μm or less.

12. The liquid crystal display device according to claim 1, wherein a screen resolution is 200 ppi or more.

13. The liquid crystal display device according to claim 1, wherein:
   the outer perimeter of the pixel electrode is a generally rectangular shape including a first side, a second side, a third side opposed to the first side, and a fourth side opposed to the second side;
   the first cut-off portion has a first right triangle shape obtained by cutting off a corner of the pixel electrode in the vicinity of the first edge portion;
   the first right triangle shape includes two sides that are at least a part of the first side and the fourth side;
   the second cut-off portion has a second right triangle shape obtained by cutting off a corner of the pixel electrode in the vicinity of the second edge portion; and
   the second right triangle shape includes two sides that are at least a part of the second side and the third side.

* * * * *